US012533184B2

(12) United States Patent
Schultheis et al.

(10) Patent No.: US 12,533,184 B2
(45) Date of Patent: Jan. 27, 2026

(54) OPTICAL CONNECTOR ASSEMBLY FOR INTRAVASCULAR LITHOTRIPSY DEVICE

(71) Applicant: Boston Scientific Scimed, Inc., Maple Grove, MN (US)

(72) Inventors: Eric Schultheis, San Clemente, CA (US); Alvin Salinas, San Marcos, CA (US); Peter Dahl, Riverside, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 279 days.

(21) Appl. No.: 18/125,050

(22) Filed: Mar. 22, 2023

(65) Prior Publication Data
US 2023/0310067 A1     Oct. 5, 2023

Related U.S. Application Data

(60) Provisional application No. 63/326,844, filed on Apr. 2, 2022.

(51) Int. Cl.
*G02B 6/38*     (2006.01)
*A61B 17/00*     (2006.01)
(Continued)

(52) U.S. Cl.
CPC .......... *A61B 18/1492* (2013.01); *A61B 18/26* (2013.01); *G02B 6/3878* (2013.01);
(Continued)

(58) Field of Classification Search
CPC . A61B 18/26; A61B 18/245; A61B 2018/263; A61B 2018/0022;
(Continued)

(56) References Cited

U.S. PATENT DOCUMENTS 4,649,924 A    3/1987   Taccardi
4,699,147 A   10/1987   Chilson et al.
(Continued)

FOREIGN PATENT DOCUMENTS

CA       3209797      9/2022
CN    110638501      1/2020
(Continued)

OTHER PUBLICATIONS

"Custom Medical Skived Tubing", Duke Extrusion, 2025. https://www.dukeextrusion.com/tubing-options/skived-tubing.
(Continued)

*Primary Examiner* — Michelle R Connelly
(74) *Attorney, Agent, or Firm* — Seager, Tufte & Wickhem, LLP

(57) ABSTRACT

A catheter system (100) for placement within a blood vessel (108) having a vessel wall (108A) for treating a treatment site (106) within or adjacent to the vessel wall (108A) within a body (107) of a patient (109) includes a system console (123), one or more energy guides (122A), and an optical connector assembly (251). The system console (123) includes an energy source (124) and a console connection aperture (148). The one or more energy guides (122A) are configured to receive energy from the energy source (124). The optical connector assembly (251) includes a guide coupling housing (250) that retains at least a portion of each of the one or more energy guides (122A). The guide coupling housing (250) is configured to be mechanically connected to the system console (123) with at least a portion of the guide coupling housing (250) being configured to fit and be selectively retained within the console connection aperture (148) so that the one or more energy guides (122A) are adjustably and more precisely aligned within the guide coupling housing (250) and relative to the energy from the
(Continued)

energy source (124) to receive the energy from the energy source (124).

20 Claims, 3 Drawing Sheets

(51) Int. Cl.
*A61B 18/00* (2006.01)
*A61B 18/14* (2006.01)
*A61B 18/22* (2006.01)
*A61B 18/24* (2006.01)
*A61B 18/26* (2006.01)
*G02B 6/42* (2006.01)
*A61B 18/12* (2006.01)

(52) U.S. Cl.
CPC .......... *G02B 6/389* (2013.01); *G02B 6/3897* (2013.01); *G02B 6/4292* (2013.01); *A61B 2017/00199* (2013.01); *A61B 2018/00172* (2013.01); *A61B 2018/0022* (2013.01); *A61B 2018/00285* (2013.01); *A61B 2018/00345* (2013.01); *A61B 2018/00369* (2013.01); *A61B 2018/0041* (2013.01); *A61B 2018/00773* (2013.01); *A61B 2018/1213* (2013.01); *A61B 2018/1467* (2013.01); *A61B 2018/2211* (2013.01); *A61B 2018/2261* (2013.01); *A61B 2018/2266* (2013.01); *A61B 2018/263* (2013.01); *A61B 2018/266* (2013.01); *G02B 6/3869* (2013.01); *G02B 6/387* (2013.01)

(58) Field of Classification Search
CPC .... A61B 2018/266; A61B 2018/00285; A61B 2018/2211; A61B 2018/00345; A61B 18/24; A61B 18/1492; A61B 2017/22025; G02B 6/3817; G02B 6/4292; G02B 6/3878; G02B 6/3821; G02B 6/3897; G02B 6/3624; G02B 6/3869
See application file for complete search history.

(56) References Cited

U.S. PATENT DOCUMENTS

| | | | |
|---|---|---|---|
| 4,799,479 A | 1/1989 | Spears | |
| 4,850,351 A | 7/1989 | Herman | |
| 4,913,142 A | 4/1990 | Kittrell et al. | |
| 4,932,954 A | 6/1990 | Wondrazek et al. | |
| 4,955,895 A | 9/1990 | Sugiyama | |
| 4,960,108 A | 10/1990 | Reichel et al. | |
| 4,994,059 A | 2/1991 | Kosa et al. | |
| 4,998,930 A | 3/1991 | Lundahl | |
| 5,019,075 A | 5/1991 | Spears et al. | |
| 5,034,010 A | 7/1991 | Kittrell et al. | |
| 5,041,121 A | 8/1991 | Wondrazek et al. | |
| 5,057,106 A | 10/1991 | Kasevich et al. | |
| 5,082,343 A | 1/1992 | Coult et al. | |
| 5,093,877 A | 3/1992 | Aita et al. | |
| 5,104,391 A | 4/1992 | Ingle | |
| 5,104,392 A | 4/1992 | Kittrell et al. | |
| 5,109,452 A | 4/1992 | Selvin et al. | |
| 5,116,227 A | 5/1992 | Levy | |
| 5,126,165 A | 6/1992 | Akihama et al. | |
| 5,133,032 A * | 7/1992 | Salter .................. | G02B 6/3825 385/59 |
| 5,138,679 A * | 8/1992 | Edwards .............. | G02B 6/4246 385/52 |
| 5,152,768 A | 10/1992 | Bhatta | |
| 5,173,049 A | 12/1992 | Levy | |
| 5,176,674 A | 1/1993 | Hofmann | |
| 5,181,921 A | 1/1993 | Makita et al. | |
| 5,188,632 A | 2/1993 | Goldenberg | |
| 5,200,838 A | 4/1993 | Nudelman | |
| 5,242,315 A * | 9/1993 | O'Dea .................. | G02B 6/387 385/59 |
| 5,269,777 A | 12/1993 | Doiron | |
| 5,290,277 A | 3/1994 | Vercimak et al. | |
| 5,324,282 A | 6/1994 | Dodick | |
| 5,328,472 A | 7/1994 | Steinke et al. | |
| 5,336,184 A | 8/1994 | Teirstein | |
| 5,363,458 A | 11/1994 | Pan | |
| 5,372,138 A | 12/1994 | Crowley | |
| 5,387,225 A | 2/1995 | Euteneur | |
| 5,400,428 A | 3/1995 | Grace | |
| 5,410,797 A | 5/1995 | Steinke et al. | |
| 5,417,689 A | 5/1995 | Fine | |
| 5,422,926 A | 6/1995 | Smith | |
| 5,431,647 A | 7/1995 | Purcell | |
| 5,454,809 A | 10/1995 | Janssen | |
| 5,456,680 A | 10/1995 | Taylor | |
| 5,474,537 A | 12/1995 | Solar | |
| 5,496,311 A | 3/1996 | Abele et al. | |
| 5,509,917 A | 4/1996 | Cecchetti | |
| 5,519,798 A | 5/1996 | Shahid | |
| 5,540,679 A | 7/1996 | Fram | |
| 5,562,657 A | 10/1996 | Griffin | |
| 5,598,494 A | 1/1997 | Behrmann et al. | |
| 5,609,606 A | 3/1997 | O'Boyle | |
| 5,611,807 A | 3/1997 | O'Boyle | |
| 5,637,877 A | 6/1997 | Sinofsky | |
| 5,661,829 A | 8/1997 | Zheng | |
| 5,697,377 A | 12/1997 | Wittkamph | |
| 5,718,241 A | 2/1998 | Ben-Haim et al. | |
| 5,729,583 A | 3/1998 | Tang | |
| 5,764,843 A | 6/1998 | Macken et al. | |
| 5,772,609 A | 6/1998 | Nguyen et al. | |
| 5,860,974 A | 1/1999 | Abele | |
| 5,891,135 A | 4/1999 | Jackson et al. | |
| 5,906,611 A | 5/1999 | Dodick et al. | |
| 5,944,697 A | 8/1999 | Benett et al. | |
| 6,007,514 A | 12/1999 | Nita | |
| 6,015,404 A | 1/2000 | Altshuler | |
| 6,080,119 A | 6/2000 | Schwarze et al. | |
| 6,123,923 A | 9/2000 | Unger | |
| 6,139,510 A | 10/2000 | Palermo | |
| 6,186,963 B1 | 2/2001 | Schwarze et al. | |
| 6,203,537 B1 | 3/2001 | Adrian | |
| 6,210,404 B1 | 4/2001 | Shadduck | |
| 6,339,470 B1 | 1/2002 | Papademetriou et al. | |
| 6,356,575 B1 | 3/2002 | Fukumoto | |
| 6,368,318 B1 | 4/2002 | Visuri et al. | |
| 6,423,055 B1 | 7/2002 | Farr | |
| 6,500,174 B1 | 12/2002 | Maguire et al. | |
| 6,514,203 B2 | 2/2003 | Bukshpan | |
| 6,514,249 B1 | 2/2003 | Maguire | |
| 6,524,251 B2 | 2/2003 | Rabiner et al. | |
| 6,538,739 B1 | 3/2003 | Visuri et al. | |
| 6,544,218 B1 | 4/2003 | Choi | |
| 6,548,010 B1 | 4/2003 | Stivland et al. | |
| 6,560,387 B1 | 5/2003 | Hehlen et al. | |
| 6,607,502 B1 | 8/2003 | Maguire et al. | |
| 6,631,220 B1 | 10/2003 | Liang et al. | |
| 6,652,547 B2 | 11/2003 | Rabiner et al. | |
| 6,666,834 B2 | 12/2003 | Restle et al. | |
| 6,702,781 B1 | 3/2004 | Reifart et al. | |
| 6,773,447 B2 | 8/2004 | Laguna | |
| 6,824,554 B1 | 11/2004 | Jang | |
| 6,849,994 B1 | 2/2005 | White et al. | |
| 6,890,317 B2 | 5/2005 | Gerdts et al. | |
| 6,947,785 B1 | 9/2005 | Beatty et al. | |
| 6,966,890 B2 | 11/2005 | Coyle et al. | |
| 6,978,168 B2 | 12/2005 | Beatty et al. | |
| 6,990,370 B1 | 1/2006 | Beatty et al. | |
| 7,273,470 B2 | 9/2007 | Wantink | |
| 7,309,324 B2 | 12/2007 | Hayes et al. | |
| 7,367,967 B2 | 5/2008 | Eidenschink | |
| 7,470,240 B2 | 12/2008 | Schultheiss et al. | |
| 7,539,231 B1 | 5/2009 | Honea et al. | |
| 7,569,032 B2 | 8/2009 | Naimark et al. | |
| 7,599,588 B2 | 10/2009 | Eberle et al. | |
| 7,641,646 B2 | 1/2010 | Kennedy, II | |
| 7,691,079 B2 | 4/2010 | Gobel | |

(56) References Cited

U.S. PATENT DOCUMENTS

| | | |
|---|---|---|
| 7,713,260 B2 | 5/2010 | Lessard |
| 7,758,572 B2 | 7/2010 | Weber et al. |
| 7,762,984 B2 | 7/2010 | Kumoyama et al. |
| 7,810,395 B2 | 10/2010 | Zhou |
| 7,850,685 B2 | 12/2010 | Kunis et al. |
| 7,867,178 B2 | 1/2011 | Simnacher |
| 7,909,797 B2 | 3/2011 | Kennedy, II et al. |
| 7,942,850 B2 | 5/2011 | Levit et al. |
| 7,967,781 B2 | 6/2011 | Simpson et al. |
| 7,972,299 B2 | 7/2011 | Carter |
| 7,985,189 B1 | 7/2011 | Ogden et al. |
| 8,021,328 B2 | 9/2011 | Lee |
| 8,029,473 B2 | 10/2011 | Carter |
| 8,043,256 B2 | 10/2011 | Hansen |
| 8,066,732 B2 | 11/2011 | Paul et al. |
| 8,088,121 B2 | 1/2012 | Nishide |
| 8,157,760 B2 | 4/2012 | Criado et al. |
| 8,162,859 B2 | 4/2012 | Schultheiss et al. |
| 8,166,825 B2 | 5/2012 | Zhou |
| 8,192,368 B2 | 6/2012 | Woodruff |
| 8,197,505 B2 | 6/2012 | Hirszowicz et al. |
| 8,246,643 B2 | 8/2012 | Nita |
| 8,267,886 B2 | 9/2012 | Ewing |
| 8,292,913 B2 | 10/2012 | Warnack |
| 8,328,820 B2 | 12/2012 | Diamant |
| 8,364,235 B2 | 1/2013 | Kordis et al. |
| 8,372,034 B2 | 2/2013 | Levit |
| 8,382,738 B2 | 2/2013 | Simpson et al. |
| 8,414,527 B2 | 4/2013 | Mallaby |
| 8,419,613 B2 | 4/2013 | Saadat |
| 8,439,890 B2 | 5/2013 | Beyar |
| 8,556,813 B2 | 10/2013 | Cashman et al. |
| 8,556,851 B2 | 10/2013 | Hirszowicz |
| 8,574,247 B2 | 11/2013 | Adams et al. |
| 8,657,814 B2 | 2/2014 | Werneth |
| 8,709,075 B2 | 4/2014 | Adams et al. |
| 8,728,091 B2 | 5/2014 | Hakala et al. |
| 8,734,424 B2 | 5/2014 | Watanabe |
| 8,747,416 B2 | 6/2014 | Hakala et al. |
| 8,784,362 B2 | 7/2014 | Boutilette |
| 8,834,510 B2 | 9/2014 | Wilson et al. |
| 8,888,788 B2 | 11/2014 | Hakala et al. |
| 8,956,371 B2 | 2/2015 | Hawkins et al. |
| 8,956,374 B2 | 2/2015 | Hawkins et al. |
| 8,986,339 B2 | 3/2015 | Warnack |
| 8,992,519 B2 | 3/2015 | Kim et al. |
| 8,992,817 B2 | 3/2015 | Stamberg |
| 9,005,216 B2 | 4/2015 | Hakala et al. |
| 9,011,462 B2 | 4/2015 | Adams et al. |
| 9,011,463 B2 | 4/2015 | Adams et al. |
| 9,011,511 B2 | 4/2015 | Gregorich |
| 9,044,575 B2 | 6/2015 | Beasley et al. |
| 9,044,618 B2 | 6/2015 | Hawkins et al. |
| 9,044,619 B2 | 6/2015 | Hawkins et al. |
| 9,056,185 B2 | 6/2015 | Fischell et al. |
| 9,072,534 B2 | 7/2015 | Adams et al. |
| 9,089,669 B2 | 7/2015 | Haslinger et al. |
| 9,131,949 B2 | 9/2015 | Coleman et al. |
| 9,138,249 B2 | 9/2015 | Adams et al. |
| 9,138,260 B2 | 9/2015 | Miller et al. |
| 9,180,280 B2 | 11/2015 | Hawkins et al. |
| 9,220,521 B2 | 12/2015 | Hawkins et al. |
| 9,237,984 B2 | 1/2016 | Hawkins et al. |
| 9,254,169 B2 | 2/2016 | Long et al. |
| 9,282,984 B2 | 3/2016 | Nita |
| 9,283,359 B2 | 3/2016 | Pepper |
| 9,289,132 B2 | 3/2016 | Ghaffari et al. |
| 9,289,224 B2 | 3/2016 | Adams et al. |
| 9,289,319 B2 | 3/2016 | Pacetti et al. |
| 9,320,530 B2 | 4/2016 | Grace |
| 9,333,000 B2 | 5/2016 | Hakala et al. |
| 9,339,632 B2 | 5/2016 | Eidenschink et al. |
| 9,364,645 B2 | 6/2016 | Erikawa |
| 9,375,223 B2 | 6/2016 | Wallace |
| 9,421,025 B2 | 8/2016 | Hawkins et al. |
| 9,433,428 B2 | 9/2016 | Hakala et al. |
| 9,433,745 B2 | 9/2016 | Cully |
| 9,504,809 B2 | 11/2016 | Bo |
| 9,510,887 B2 | 12/2016 | Burnett |
| 9,522,012 B2 | 12/2016 | Adams |
| 9,554,815 B2 | 1/2017 | Adams et al. |
| 9,555,267 B2 | 1/2017 | Ein-gal |
| 9,566,209 B2 | 2/2017 | Katragadda et al. |
| 9,579,114 B2 | 2/2017 | Mantell et al. |
| 9,579,492 B2 | 2/2017 | Simpson |
| 9,585,684 B2 | 3/2017 | Nita et al. |
| 9,592,328 B2 | 3/2017 | Jeevanandam |
| 9,603,506 B2 | 3/2017 | Goldfarb et al. |
| 9,629,567 B2 | 4/2017 | Porath et al. |
| 9,642,673 B2 | 5/2017 | Adams |
| 9,662,069 B2 | 5/2017 | De Graff et al. |
| 9,687,166 B2 | 6/2017 | Subramaniam |
| 9,700,655 B2 | 7/2017 | Laudenslager et al. |
| 9,730,715 B2 | 8/2017 | Adams |
| 9,737,361 B2 | 8/2017 | Magana |
| 9,764,142 B2 | 9/2017 | Imran |
| 9,782,570 B2 | 10/2017 | Hirszowicz |
| 9,814,476 B2 | 11/2017 | Adams et al. |
| 9,833,348 B2 | 12/2017 | Jordan et al. |
| 9,839,764 B2 | 12/2017 | Chouinard |
| 9,861,377 B2 | 1/2018 | Mantell et al. |
| 9,867,629 B2 | 1/2018 | Hawkins et al. |
| 9,878,135 B2 | 1/2018 | Holzapfel et al. |
| 9,894,756 B2 | 2/2018 | Weinkam et al. |
| 9,901,704 B2 | 2/2018 | Appling |
| 9,955,946 B2 | 5/2018 | Miller et al. |
| 9,974,963 B2 | 5/2018 | Imran |
| 9,974,970 B2 | 5/2018 | Nuta et al. |
| 9,993,292 B2 | 6/2018 | Adams et al. |
| 10,039,561 B2 | 8/2018 | Adams et al. |
| 10,076,384 B2 | 9/2018 | Kasprzyk |
| 10,086,175 B2 | 10/2018 | Torres et al. |
| 10,124,153 B2 | 11/2018 | Feig |
| 10,136,829 B2 | 11/2018 | Deno et al. |
| 10,149,690 B2 | 12/2018 | Hawkins et al. |
| 10,159,505 B2 | 12/2018 | Hakala et al. |
| 10,194,994 B2 | 2/2019 | Deno et al. |
| 10,201,387 B2 | 2/2019 | Grace et al. |
| 10,206,698 B2 | 2/2019 | Hakala et al. |
| 10,226,265 B2 | 3/2019 | Ku et al. |
| 10,245,410 B2 | 4/2019 | Aggerholm |
| 10,327,846 B1 | 6/2019 | Stark et al. |
| 10,328,290 B2 | 6/2019 | Zhou et al. |
| 10,357,264 B2 | 7/2019 | Kat-Kuoy |
| 10,405,923 B2 | 9/2019 | Yu et al. |
| 10,406,031 B2 | 9/2019 | Thyzel |
| 10,406,318 B2 | 9/2019 | Williams |
| 10,420,569 B2 | 9/2019 | Adams |
| 10,439,791 B2 | 10/2019 | Kalhan |
| 10,441,300 B2 | 10/2019 | Hawkins |
| 10,449,339 B2 | 10/2019 | Wilson et al. |
| 10,463,430 B2 | 11/2019 | Dick |
| 10,478,202 B2 | 11/2019 | Adams et al. |
| 10,517,620 B2 | 12/2019 | Adams |
| 10,517,621 B1 | 12/2019 | Hakala et al. |
| 10,537,287 B2 | 1/2020 | Braido et al. |
| 10,555,744 B2 | 2/2020 | Nguyen et al. |
| 10,561,428 B2 | 2/2020 | Eggert et al. |
| 10,583,277 B2 | 3/2020 | Rundquist |
| 10,589,073 B2 | 3/2020 | Mallaby |
| 10,617,850 B2 | 4/2020 | Tal |
| 10,646,240 B2 | 5/2020 | Betelia et al. |
| 10,668,245 B2 | 6/2020 | Kanae |
| 10,682,178 B2 | 6/2020 | Adams et al. |
| 10,695,531 B2 | 6/2020 | Suzuki |
| 10,702,293 B2 | 7/2020 | Adams et al. |
| 10,709,462 B2 | 7/2020 | Nguyen et al. |
| 10,709,872 B2 | 7/2020 | Alvarez et al. |
| 10,758,255 B2 | 9/2020 | Adams |
| 10,797,684 B1 | 10/2020 | Benz et al. |
| 10,799,688 B2 | 10/2020 | Calhoun |
| 10,842,567 B2 | 11/2020 | Grace et al. |
| 10,850,075 B2 | 12/2020 | Tarunaga |
| 10,857,329 B2 | 12/2020 | Davies |

(56) References Cited

U.S. PATENT DOCUMENTS

| | | |
|---|---|---|
| 10,933,225 B2 | 3/2021 | Campbell |
| 10,952,740 B2 | 3/2021 | Dasnurkar et al. |
| 10,952,790 B2 | 3/2021 | Haverkost et al. |
| 10,959,743 B2 | 3/2021 | Adams et al. |
| 10,966,737 B2 | 4/2021 | Nguyen |
| 10,967,156 B2 | 4/2021 | Gulachenski |
| 10,973,538 B2 | 4/2021 | Hakala et al. |
| 10,974,028 B2 | 4/2021 | Buller et al. |
| 10,980,987 B2 | 4/2021 | Tarunaga |
| 11,000,299 B2 | 5/2021 | Hawkins et al. |
| 11,020,135 B1 | 6/2021 | Hawkins |
| 11,026,707 B2 | 6/2021 | Ku et al. |
| 11,040,176 B2 | 6/2021 | Blanchard et al. |
| 11,058,492 B2 | 7/2021 | Grace et al. |
| 11,076,874 B2 | 8/2021 | Hakala et al. |
| 11,116,939 B2 | 9/2021 | Jamous et al. |
| 11,141,131 B2 | 10/2021 | Stigall |
| 11,179,169 B2 | 11/2021 | Brouillete et al. |
| 11,207,493 B2 | 12/2021 | Suzuki et al. |
| 11,213,661 B2 | 1/2022 | Spindler |
| 11,229,772 B2 | 1/2022 | Nita |
| 11,229,776 B2 | 1/2022 | Kugler et al. |
| 11,246,659 B2 | 2/2022 | Grace et al. |
| 11,253,681 B2 | 2/2022 | Williams |
| 11,266,817 B2 | 3/2022 | Cope et al. |
| 11,389,171 B2 | 7/2022 | Goldsmith |
| 11,389,628 B2 | 7/2022 | Spencer |
| 11,395,669 B2 | 7/2022 | O'Malley et al. |
| 11,399,862 B2 | 8/2022 | Massimini et al. |
| 11,406,452 B2 | 8/2022 | Efremkin |
| 11,406,799 B2 | 8/2022 | McEvaddy et al. |
| 11,484,327 B2 | 11/2022 | Anderson et al. |
| 11,540,848 B2 | 1/2023 | Cai et al. |
| 11,564,729 B2 | 1/2023 | Walzman |
| 11,602,363 B2 | 3/2023 | Nguyen |
| 11,633,200 B2 | 4/2023 | Anderson et al. |
| 11,672,585 B2 | 6/2023 | Schultheis |
| 11,672,599 B2 | 6/2023 | Schultheis et al. |
| 11,707,323 B2 | 7/2023 | Schultheis et al. |
| 11,771,449 B2 | 10/2023 | Adams et al. |
| 11,779,363 B2 | 10/2023 | Vo |
| 11,826,530 B2 | 11/2023 | Suzuki |
| 11,839,391 B2 | 12/2023 | Schultheis et al. |
| 11,911,054 B2 | 2/2024 | Singla |
| 11,911,056 B2 | 2/2024 | Anderson et al. |
| 11,918,285 B2 | 3/2024 | Sun et al. |
| 11,944,331 B2 | 4/2024 | Anderson et al. |
| 11,950,793 B2 | 4/2024 | Nguyen |
| 12,011,185 B2 | 6/2024 | Vo |
| 12,023,098 B2 | 7/2024 | Nguyen |
| 12,035,932 B1 | 7/2024 | Nunes |
| 12,076,077 B2 | 9/2024 | Mori |
| 12,144,516 B2 | 11/2024 | Betelia |
| 12,178,458 B1 | 12/2024 | Betelia et al. |
| 12,193,691 B2 | 1/2025 | Adams |
| 2001/0016761 A1 | 8/2001 | Rudie |
| 2001/0018569 A1 | 8/2001 | Erbel |
| 2001/0020164 A1 | 9/2001 | Papademetriou |
| 2001/0049464 A1 | 12/2001 | Ganz |
| 2001/0051784 A1 | 12/2001 | Brisken |
| 2002/0045811 A1 | 4/2002 | Kittrell et al. |
| 2002/0052621 A1 | 5/2002 | Fried et al. |
| 2002/0065512 A1 | 5/2002 | Fjield et al. |
| 2002/0082553 A1 | 6/2002 | Duchamp |
| 2002/0183620 A1 | 12/2002 | Tearney |
| 2002/0183729 A1 | 12/2002 | Farr et al. |
| 2002/0188204 A1 | 12/2002 | McNamara et al. |
| 2003/0009157 A1 | 1/2003 | Levine et al. |
| 2003/0050632 A1 | 3/2003 | Fjield et al. |
| 2003/0065316 A1 | 4/2003 | Levine et al. |
| 2003/0114901 A1 | 6/2003 | Loeb et al. |
| 2003/0125719 A1 | 7/2003 | Furnish |
| 2003/0144654 A1 | 7/2003 | Hilal |
| 2003/0176873 A1 | 9/2003 | Chernenko et al. |
| 2004/0002677 A1 | 1/2004 | Gentsler |
| 2004/0024349 A1 | 2/2004 | Flock et al. |
| 2004/0073251 A1 | 4/2004 | Weber |
| 2004/0097996 A1 | 5/2004 | Rabiner |
| 2004/0133254 A1 | 7/2004 | Sterzer et al. |
| 2004/0162508 A1 | 8/2004 | Uebelacker |
| 2004/0210278 A1 | 10/2004 | Boll |
| 2004/0243119 A1 | 12/2004 | Lane et al. |
| 2004/0249401 A1 | 12/2004 | Rabiner |
| 2004/0254570 A1 | 12/2004 | Hadsjicostis |
| 2005/0010095 A1 | 1/2005 | Stewart et al. |
| 2005/0021013 A1 | 1/2005 | Visuri |
| 2005/0080396 A1 | 4/2005 | Rontal |
| 2005/0113722 A1 | 5/2005 | Schultheiss |
| 2005/0171437 A1 | 8/2005 | Carberry |
| 2005/0171527 A1 | 8/2005 | Bhola |
| 2005/0251131 A1 | 11/2005 | Lesh |
| 2005/0259319 A1 | 11/2005 | Brooker |
| 2005/0273014 A1 | 12/2005 | Gianchandani et al. |
| 2005/0277839 A1 | 12/2005 | Alderman et al. |
| 2006/0033241 A1 | 2/2006 | Schewe et al. |
| 2006/0084966 A1 | 4/2006 | Maguire et al. |
| 2006/0098921 A1 | 5/2006 | Benaron et al. |
| 2006/0142703 A1 | 6/2006 | Carter |
| 2006/0190022 A1 | 8/2006 | Beyar et al. |
| 2006/0200039 A1 | 9/2006 | Brockway et al. |
| 2006/0221528 A1 | 10/2006 | Li et al. |
| 2006/0241524 A1 | 10/2006 | Lee et al. |
| 2006/0241572 A1 | 10/2006 | Zhou |
| 2006/0241733 A1 | 10/2006 | Zhang et al. |
| 2006/0270976 A1 | 11/2006 | Savage et al. |
| 2007/0027524 A1 | 2/2007 | Johnson |
| 2007/0043340 A1 | 2/2007 | Thyzel |
| 2007/0060990 A1 | 3/2007 | Satake |
| 2007/0088380 A1 | 4/2007 | Hirszowicz et al. |
| 2007/0118057 A1 | 5/2007 | Ein-gal |
| 2007/0142779 A1 | 6/2007 | Duane |
| 2007/0142819 A1 | 6/2007 | El-Nounou et al. |
| 2007/0142821 A1 | 6/2007 | Hennessy et al. |
| 2007/0142856 A1 | 6/2007 | Jang |
| 2007/0179496 A1 | 8/2007 | Swoyer |
| 2007/0239082 A1 | 10/2007 | Schultheiss et al. |
| 2007/0255270 A1 | 11/2007 | Carney |
| 2007/0264353 A1 | 11/2007 | Myntti et al. |
| 2007/0270897 A1 | 11/2007 | Skerven |
| 2007/0280311 A1 | 12/2007 | Hofmann |
| 2007/0299392 A1 | 12/2007 | Beyar et al. |
| 2008/0033519 A1 | 2/2008 | Burwell |
| 2008/0081950 A1 | 4/2008 | Koenig et al. |
| 2008/0086118 A1 | 4/2008 | Lai |
| 2008/0095714 A1 | 4/2008 | Castella et al. |
| 2008/0097251 A1 | 4/2008 | Babaev |
| 2008/0108867 A1 | 5/2008 | Zhou |
| 2008/0114341 A1 | 5/2008 | Thyzel |
| 2008/0132810 A1 | 6/2008 | Scoseria et al. |
| 2008/0175539 A1 | 7/2008 | Brown |
| 2008/0195088 A1 | 8/2008 | Farr et al. |
| 2008/0214891 A1 | 9/2008 | Slenker et al. |
| 2008/0221550 A1 | 9/2008 | Lee |
| 2008/0281157 A1 | 11/2008 | Miyagi et al. |
| 2008/0296152 A1 | 12/2008 | Voss |
| 2008/0319356 A1 | 12/2008 | Cain et al. |
| 2009/0036803 A1 | 2/2009 | Warlick et al. |
| 2009/0043300 A1 | 2/2009 | Reitmajer et al. |
| 2009/0054881 A1 | 2/2009 | Krespi |
| 2009/0097806 A1 | 4/2009 | Viellerobe et al. |
| 2009/0125007 A1 | 5/2009 | Splinter |
| 2009/0131921 A1 | 5/2009 | Kurtz et al. |
| 2009/0192495 A1 | 7/2009 | Ostrovsky et al. |
| 2009/0240242 A1 | 9/2009 | Neuberger |
| 2009/0247945 A1 | 10/2009 | Levit |
| 2009/0281531 A1 | 11/2009 | Rizoiu |
| 2009/0292296 A1 | 11/2009 | Pansky |
| 2009/0296751 A1 | 12/2009 | Kewitsch et al. |
| 2009/0299327 A1 | 12/2009 | Tilson et al. |
| 2009/0306533 A1 | 12/2009 | Rousche |
| 2009/0312768 A1 | 12/2009 | Hawkins et al. |
| 2010/0016862 A1 | 1/2010 | Hawkins et al. |
| 2010/0036238 A1 | 2/2010 | Neidert |
| 2010/0036294 A1 | 2/2010 | Mantell et al. |

(56) References Cited

U.S. PATENT DOCUMENTS

| | | |
|---|---|---|
| 2010/0063491 A1 | 3/2010 | Verhagen |
| 2010/0094209 A1 | 4/2010 | Drasler et al. |
| 2010/0114020 A1 | 5/2010 | Hawkins et al. |
| 2010/0114065 A1 | 5/2010 | Hawkins et al. |
| 2010/0125268 A1 | 5/2010 | Gustus et al. |
| 2010/0160838 A1 | 6/2010 | Krespi |
| 2010/0160903 A1 | 6/2010 | Krespi |
| 2010/0168572 A1 | 7/2010 | Sliwa |
| 2010/0168836 A1 | 7/2010 | Kassab |
| 2010/0168862 A1 | 7/2010 | Edie et al. |
| 2010/0179632 A1 | 7/2010 | Bruszewski et al. |
| 2010/0191089 A1 | 7/2010 | Stebler et al. |
| 2010/0198114 A1 | 8/2010 | Novak et al. |
| 2010/0199773 A1 | 8/2010 | Zhou |
| 2010/0222786 A1 | 9/2010 | Kassab |
| 2010/0234875 A1 | 9/2010 | Allex et al. |
| 2010/0256535 A1 | 10/2010 | Novak et al. |
| 2010/0265733 A1 | 10/2010 | O'Leary |
| 2010/0286791 A1 | 11/2010 | Goldsmith |
| 2010/0316333 A1 | 12/2010 | Luther |
| 2011/0034832 A1 | 2/2011 | Cioanta et al. |
| 2011/0059415 A1 | 3/2011 | Kasenbacher |
| 2011/0082452 A1 | 4/2011 | Melsky |
| 2011/0082534 A1 | 4/2011 | Wallace |
| 2011/0118634 A1 | 5/2011 | Golan |
| 2011/0144502 A1 | 6/2011 | Zhou et al. |
| 2011/0184244 A1 | 7/2011 | Kagaya et al. |
| 2011/0208185 A1 | 8/2011 | Diamant et al. |
| 2011/0213349 A1 | 9/2011 | Brown |
| 2011/0245740 A1 | 10/2011 | Novak et al. |
| 2011/0257641 A1 | 10/2011 | Hastings et al. |
| 2011/0263921 A1 | 10/2011 | Vrba et al. |
| 2011/0275990 A1 | 11/2011 | Besser et al. |
| 2011/0306956 A1 | 12/2011 | Islam |
| 2012/0064141 A1 | 3/2012 | Andreacchi et al. |
| 2012/0071715 A1 | 3/2012 | Beyar et al. |
| 2012/0071867 A1 | 3/2012 | Ryan |
| 2012/0071889 A1 | 3/2012 | Mantell et al. |
| 2012/0089132 A1 | 4/2012 | Dick et al. |
| 2012/0095335 A1 | 4/2012 | Sverdlik et al. |
| 2012/0095461 A1 | 4/2012 | Herscher et al. |
| 2012/0116289 A1 | 5/2012 | Hawkins et al. |
| 2012/0116486 A1 | 5/2012 | Naga et al. |
| 2012/0123331 A1 | 5/2012 | Satake |
| 2012/0123399 A1 | 5/2012 | Belikov |
| 2012/0143131 A1 | 6/2012 | Tun |
| 2012/0157892 A1 | 6/2012 | Reitmajer et al. |
| 2012/0203255 A1 | 8/2012 | Hawkins et al. |
| 2012/0221013 A1 | 8/2012 | Hawkins et al. |
| 2012/0232409 A1 | 9/2012 | Stahmann |
| 2012/0296367 A1 | 11/2012 | Grovender et al. |
| 2012/0323211 A1 | 12/2012 | Ogle |
| 2012/0330293 A1 | 12/2012 | Arai |
| 2013/0030431 A1 | 1/2013 | Adams |
| 2013/0030447 A1 | 1/2013 | Adams |
| 2013/0041355 A1 | 2/2013 | Heeren et al. |
| 2013/0046207 A1 | 2/2013 | Capelli |
| 2013/0046293 A1 | 2/2013 | Arai et al. |
| 2013/0053762 A1 | 2/2013 | Rontal et al. |
| 2013/0060234 A1 | 3/2013 | Besser |
| 2013/0110003 A1 | 5/2013 | Surti |
| 2013/0116714 A1 | 5/2013 | Adams et al. |
| 2013/0165764 A1 | 6/2013 | Scheuermann |
| 2013/0190803 A1 | 7/2013 | Angel et al. |
| 2013/0197614 A1 | 8/2013 | Gustus |
| 2013/0218054 A1 | 8/2013 | Sverdlik et al. |
| 2013/0226131 A1 | 8/2013 | Bacino et al. |
| 2013/0253466 A1 | 9/2013 | Campbell |
| 2013/0274726 A1 | 10/2013 | Takayama |
| 2013/0345617 A1 | 12/2013 | Wallace |
| 2014/0005576 A1 | 1/2014 | Adams |
| 2014/0005706 A1 | 1/2014 | Gelfand et al. |
| 2014/0012186 A1 | 1/2014 | Thyzel |
| 2014/0039002 A1 | 2/2014 | Diodone et al. |
| 2014/0039358 A1 | 2/2014 | Zhou et al. |
| 2014/0039513 A1 | 2/2014 | Hakala |
| 2014/0046229 A1 | 2/2014 | Hawkins et al. |
| 2014/0046353 A1 | 2/2014 | Adams |
| 2014/0052146 A1 | 2/2014 | Curtis et al. |
| 2014/0052147 A1 | 2/2014 | Hakala et al. |
| 2014/0058294 A1 | 2/2014 | Gross et al. |
| 2014/0074111 A1 | 3/2014 | Hakala |
| 2014/0114198 A1* | 4/2014 | Sawada ............... G02B 6/3878 |
| | | 600/478 |
| 2014/0128848 A1 | 5/2014 | Appling et al. |
| 2014/0153087 A1 | 6/2014 | Hutchings et al. |
| 2014/0155990 A1 | 6/2014 | Nyuli |
| 2014/0180069 A1 | 6/2014 | Millett |
| 2014/0180126 A1 | 6/2014 | Millett |
| 2014/0180134 A1 | 6/2014 | Hoseit |
| 2014/0188094 A1 | 7/2014 | Islam |
| 2014/0228829 A1 | 8/2014 | Schmitt |
| 2014/0257144 A1 | 9/2014 | Capelli et al. |
| 2014/0257148 A1 | 9/2014 | Jie |
| 2014/0276573 A1 | 9/2014 | Miesel |
| 2014/0288570 A1 | 9/2014 | Adams |
| 2014/0309536 A1 | 10/2014 | Douk et al. |
| 2014/0336626 A1 | 11/2014 | Jiang |
| 2014/0336637 A1 | 11/2014 | Agrawal |
| 2014/0357997 A1 | 12/2014 | Hartmann |
| 2015/0003900 A1 | 1/2015 | Ullrich et al. |
| 2015/0005576 A1 | 1/2015 | Diodone et al. |
| 2015/0039002 A1 | 2/2015 | Hawkins |
| 2015/0057648 A1 | 2/2015 | Swift et al. |
| 2015/0071591 A1 | 3/2015 | Chen |
| 2015/0073430 A1 | 3/2015 | Hakala et al. |
| 2015/0080875 A1 | 3/2015 | Kasprzyk et al. |
| 2015/0100048 A1 | 4/2015 | Hiereth et al. |
| 2015/0105715 A1 | 4/2015 | Pikus et al. |
| 2015/0119870 A1 | 4/2015 | Rudie |
| 2015/0126990 A1 | 5/2015 | Sharma |
| 2015/0141764 A1 | 5/2015 | Harks et al. |
| 2015/0250542 A1 | 9/2015 | Islam |
| 2015/0276689 A1 | 10/2015 | Watanabe et al. |
| 2015/0313732 A1 | 11/2015 | Fulton, III |
| 2015/0320432 A1 | 11/2015 | Adams |
| 2015/0342678 A1 | 12/2015 | Deladurantaye et al. |
| 2015/0342681 A1 | 12/2015 | Lee |
| 2015/0359432 A1 | 12/2015 | Ehrenreich |
| 2015/0359557 A1 | 12/2015 | Shimokawa |
| 2016/0008016 A1 | 1/2016 | Cioanta et al. |
| 2016/0016016 A1 | 1/2016 | Taylor et al. |
| 2016/0018602 A1 | 1/2016 | Govari et al. |
| 2016/0022294 A1 | 1/2016 | Cioanta et al. |
| 2016/0038087 A1 | 2/2016 | Hunter |
| 2016/0095610 A1 | 4/2016 | Lipowski et al. |
| 2016/0128583 A1* | 5/2016 | Caron .................. A61B 5/283 |
| | | 600/486 |
| 2016/0135828 A1 | 5/2016 | Hawkins et al. |
| 2016/0135891 A1 | 5/2016 | Feldman |
| 2016/0143522 A1 | 5/2016 | Ransbury |
| 2016/0151639 A1 | 6/2016 | Scharf et al. |
| 2016/0183819 A1 | 6/2016 | Burnett |
| 2016/0183957 A1 | 6/2016 | Hakala et al. |
| 2016/0184020 A1 | 6/2016 | Kowalewski et al. |
| 2016/0184022 A1 | 6/2016 | Grace et al. |
| 2016/0184023 A1 | 6/2016 | Grace et al. |
| 2016/0184526 A1 | 6/2016 | Beyar |
| 2016/0184570 A1 | 6/2016 | Grace et al. |
| 2016/0228187 A1 | 8/2016 | Gross |
| 2016/0234534 A1 | 8/2016 | Kitahara et al. |
| 2016/0262784 A1 | 9/2016 | Grace et al. |
| 2016/0270806 A1 | 9/2016 | Wallace |
| 2016/0302762 A1 | 10/2016 | Stigall et al. |
| 2016/0324564 A1 | 11/2016 | Gerlach et al. |
| 2016/0331389 A1 | 11/2016 | Hakala et al. |
| 2016/0339204 A1 | 11/2016 | Williams |
| 2016/0367274 A1 | 12/2016 | Wallace |
| 2016/0367275 A1 | 12/2016 | Wallace |
| 2017/0049463 A1 | 2/2017 | Popovic et al. |
| 2017/0056035 A1 | 3/2017 | Adams |
| 2017/0086867 A1 | 3/2017 | Adams |
| 2017/0119469 A1 | 5/2017 | Shimizu et al. |
| 2017/0119470 A1 | 5/2017 | Diamant et al. |

(56) References Cited

U.S. PATENT DOCUMENTS

| | | |
|---|---|---|
| 2017/0135709 A1 | 5/2017 | Nguyen et al. |
| 2017/0151421 A1 | 6/2017 | Asher |
| 2017/0192242 A1 | 7/2017 | Laycock |
| 2017/0209050 A1 | 7/2017 | Fengler et al. |
| 2017/0265942 A1 | 9/2017 | Grace et al. |
| 2017/0303946 A1 | 10/2017 | Ku et al. |
| 2017/0311965 A1 | 11/2017 | Adams |
| 2018/0008348 A1 | 1/2018 | Grace et al. |
| 2018/0042661 A1 | 2/2018 | Long |
| 2018/0042677 A1 | 2/2018 | Yu et al. |
| 2018/0045897 A1 | 2/2018 | Chia |
| 2018/0049877 A1 | 2/2018 | Venkatasubramanian |
| 2018/0085174 A1 | 3/2018 | Radtke et al. |
| 2018/0092763 A1 | 4/2018 | Dagan et al. |
| 2018/0095287 A1 | 4/2018 | Jeng et al. |
| 2018/0098779 A1 | 4/2018 | Betelia et al. |
| 2018/0152568 A1 | 5/2018 | Thumpudi et al. |
| 2018/0169392 A1 | 6/2018 | Franklin |
| 2018/0214677 A1 | 8/2018 | Tarunaga |
| 2018/0238675 A1 | 8/2018 | Wan |
| 2018/0256250 A1 | 9/2018 | Adams et al. |
| 2018/0280005 A1 | 10/2018 | Parmentier |
| 2018/0303501 A1 | 10/2018 | Hawkins |
| 2018/0303503 A1 | 10/2018 | Eggert et al. |
| 2018/0303504 A1 | 10/2018 | Eggert et al. |
| 2018/0304053 A1 | 10/2018 | Eggert et al. |
| 2018/0323571 A1 | 11/2018 | Brown et al. |
| 2018/0333043 A1 | 11/2018 | Teriluc |
| 2018/0360482 A1 | 12/2018 | Nguyen |
| 2019/0029702 A1 | 1/2019 | De Cicco |
| 2019/0029703 A1 | 1/2019 | Wasdyke et al. |
| 2019/0069916 A1 | 3/2019 | Hawkins et al. |
| 2019/0072378 A1 | 3/2019 | Hane et al. |
| 2019/0097380 A1 | 3/2019 | Luft et al. |
| 2019/0099588 A1 | 4/2019 | Ramanath et al. |
| 2019/0104933 A1 | 4/2019 | Stern |
| 2019/0117242 A1 | 4/2019 | Lawinger |
| 2019/0150960 A1 | 5/2019 | Nguyen et al. |
| 2019/0150961 A1 | 5/2019 | Tozzi |
| 2019/0159792 A1 | 5/2019 | Panian |
| 2019/0167349 A1 | 6/2019 | Shamay |
| 2019/0175111 A1 | 6/2019 | Genereux et al. |
| 2019/0175300 A1 | 6/2019 | Hom |
| 2019/0175372 A1 | 6/2019 | Boyden et al. |
| 2019/0175407 A1 | 6/2019 | Bacher |
| 2019/0209368 A1 | 7/2019 | Park et al. |
| 2019/0232066 A1 | 8/2019 | Lim et al. |
| 2019/0247680 A1 | 8/2019 | Mayer |
| 2019/0262594 A1 | 8/2019 | Ogata et al. |
| 2019/0265419 A1 | 8/2019 | Tayebati |
| 2019/0282249 A1 | 9/2019 | Tran et al. |
| 2019/0282250 A1 | 9/2019 | Tran et al. |
| 2019/0285803 A1 | 9/2019 | Van Zuylen |
| 2019/0321100 A1 | 10/2019 | Masotti et al. |
| 2019/0321101 A1 | 10/2019 | Masotti et al. |
| 2019/0328259 A1 | 10/2019 | Deno et al. |
| 2019/0365400 A1 | 12/2019 | Adams et al. |
| 2019/0380589 A1 | 12/2019 | Lloret |
| 2019/0388002 A1 | 12/2019 | Bozsak et al. |
| 2019/0388110 A1 | 12/2019 | Nguyen et al. |
| 2019/0388133 A1 | 12/2019 | Sharma |
| 2019/0388151 A1 | 12/2019 | Bhawalkar |
| 2019/0388654 A1 | 12/2019 | Chou |
| 2020/0000484 A1 | 1/2020 | Hawkins |
| 2020/0008856 A1 | 1/2020 | Harmouche |
| 2020/0022754 A1 | 1/2020 | Cottone |
| 2020/0038087 A1 | 2/2020 | Harmouche |
| 2020/0046429 A1 | 2/2020 | Tschida et al. |
| 2020/0046949 A1 | 2/2020 | Chisena et al. |
| 2020/0054352 A1 | 2/2020 | Brouillette et al. |
| 2020/0060814 A1 | 2/2020 | Murphy |
| 2020/0061931 A1 | 2/2020 | Brown et al. |
| 2020/0069371 A1 | 3/2020 | Brown et al. |
| 2020/0085458 A1 | 3/2020 | Nguyen et al. |
| 2020/0085459 A1 | 3/2020 | Adams |
| 2020/0101269 A1 | 4/2020 | Hayes |
| 2020/0107960 A1 | 4/2020 | Bacher |
| 2020/0108236 A1 | 4/2020 | Salazar et al. |
| 2020/0129195 A1 | 4/2020 | McGowan et al. |
| 2020/0129741 A1 | 4/2020 | Kawwas |
| 2020/0129742 A1* | 4/2020 | Cope .............. A61B 17/22022 |
| 2020/0155812 A1 | 5/2020 | Zhang et al. |
| 2020/0197019 A1 | 6/2020 | Harper |
| 2020/0205890 A1 | 7/2020 | Harlev |
| 2020/0246032 A1 | 8/2020 | Betelia et al. |
| 2020/0289202 A1 | 9/2020 | Miyagawa et al. |
| 2020/0297366 A1 | 9/2020 | Nguyen et al. |
| 2020/0337717 A1 | 10/2020 | Walzman |
| 2020/0345380 A1 | 11/2020 | Boyle et al. |
| 2020/0383724 A1 | 12/2020 | Adams et al. |
| 2020/0397230 A1 | 12/2020 | Massimini et al. |
| 2020/0397453 A1 | 12/2020 | McGowan |
| 2020/0398033 A1 | 12/2020 | McGowan et al. |
| 2020/0405333 A1 | 12/2020 | Massimini et al. |
| 2020/0405391 A1 | 12/2020 | Massimini et al. |
| 2020/0406009 A1 | 12/2020 | Massimini |
| 2020/0406010 A1 | 12/2020 | Massimini et al. |
| 2021/0038237 A1 | 2/2021 | Adams |
| 2021/0085347 A1 | 3/2021 | Phan et al. |
| 2021/0085348 A1 | 3/2021 | Nguyen |
| 2021/0085383 A1 | 3/2021 | Vo et al. |
| 2021/0116302 A1 | 4/2021 | Jean-Ruel |
| 2021/0128241 A1 | 5/2021 | Schultheis |
| 2021/0137598 A1 | 5/2021 | Cook |
| 2021/0153939 A1 | 5/2021 | Cook |
| 2021/0177442 A1 | 6/2021 | Girdhar et al. |
| 2021/0177445 A1 | 6/2021 | Nguyen |
| 2021/0186613 A1 | 6/2021 | Cook |
| 2021/0212765 A1 | 7/2021 | Verhagen |
| 2021/0220052 A1 | 7/2021 | Cook |
| 2021/0220053 A1 | 7/2021 | Cook |
| 2021/0244473 A1 | 8/2021 | Cook et al. |
| 2021/0267685 A1 | 9/2021 | Schultheis |
| 2021/0275247 A1 | 9/2021 | Schultheis |
| 2021/0275249 A1 | 9/2021 | Massimini et al. |
| 2021/0282792 A1 | 9/2021 | Adams et al. |
| 2021/0290259 A1 | 9/2021 | Hakala et al. |
| 2021/0290286 A1 | 9/2021 | Cook |
| 2021/0290305 A1 | 9/2021 | Cook |
| 2021/0298603 A1 | 9/2021 | Feldman |
| 2021/0338258 A1 | 11/2021 | Hawkins et al. |
| 2021/0353359 A1 | 11/2021 | Cook |
| 2021/0369348 A1 | 12/2021 | Cook |
| 2021/0378743 A1 | 12/2021 | Massimini et al. |
| 2021/0378744 A1 | 12/2021 | Fanier et al. |
| 2021/0386479 A1 | 12/2021 | Massimini et al. |
| 2022/0000505 A1 | 1/2022 | Hauser |
| 2022/0000506 A1 | 1/2022 | Hauser |
| 2022/0000507 A1 | 1/2022 | Hauser |
| 2022/0000508 A1 | 1/2022 | Schmitt et al. |
| 2022/0000509 A1 | 1/2022 | Laser et al. |
| 2022/0000551 A1 | 1/2022 | Govari et al. |
| 2022/0001138 A1 | 1/2022 | Howell |
| 2022/0008130 A1 | 1/2022 | Massimini et al. |
| 2022/0008693 A1 | 1/2022 | Humbert et al. |
| 2022/0015785 A1 | 1/2022 | Hakala et al. |
| 2022/0021190 A1 | 1/2022 | Pecquois |
| 2022/0022902 A1 | 1/2022 | Spano |
| 2022/0022912 A1 | 1/2022 | Efremkin |
| 2022/0023528 A1 | 1/2022 | Long et al. |
| 2022/0040454 A1 | 2/2022 | Hamm |
| 2022/0054194 A1 | 2/2022 | Bacher et al. |
| 2022/0071704 A1 | 3/2022 | Le |
| 2022/0168594 A1 | 6/2022 | Mayer |
| 2022/0183738 A1 | 6/2022 | Flores et al. |
| 2022/0218402 A1 | 7/2022 | Schultheis |
| 2022/0249165 A1 | 8/2022 | Cook |
| 2022/0249166 A1 | 8/2022 | Cook et al. |
| 2022/0273324 A1 | 9/2022 | Schultheis |
| 2022/0287732 A1 | 9/2022 | Anderson et al. |
| 2022/0313293 A1 | 10/2022 | Singh |
| 2022/0313359 A1 | 10/2022 | Schultheis et al. |
| 2022/0338890 A1 | 10/2022 | Anderson et al. |
| 2022/0354578 A1 | 11/2022 | Cook |

(56) References Cited

U.S. PATENT DOCUMENTS

| | | |
|---|---|---|
| 2022/0387106 A1 | 12/2022 | Cook |
| 2023/0013920 A1 | 1/2023 | Massimini |
| 2023/0064371 A1 | 3/2023 | Cook et al. |
| 2023/0137107 A1 | 5/2023 | Cook et al. |
| 2023/0157754 A1 | 5/2023 | Bacher et al. |
| 2023/0200906 A1 | 6/2023 | Cook et al. |
| 2023/0233256 A1 | 7/2023 | Cook et al. |
| 2023/0240748 A1 | 8/2023 | Cook et al. |
| 2023/0248376 A1 | 8/2023 | Anderson et al. |
| 2023/0255635 A1 | 8/2023 | Schultheis et al. |
| 2023/0255688 A1 | 8/2023 | Schultheis et al. |
| 2023/0255689 A1 | 8/2023 | Schultheis et al. |
| 2023/0310054 A1 | 10/2023 | Schultheis |
| 2023/0310067 A1 | 10/2023 | Schultheis et al. |
| 2023/0310073 A1 | 10/2023 | Adams et al. |
| 2023/0320576 A1 | 10/2023 | Feldman |
| 2023/0338088 A1 | 10/2023 | Massimini et al. |
| 2023/0338089 A1 | 10/2023 | Schultheis |
| 2023/0414234 A1 | 12/2023 | Anderson et al. |
| 2024/0001076 A1 | 1/2024 | Gelsinger |
| 2024/0016508 A1 | 1/2024 | Kocur |
| 2024/0016544 A1 | 1/2024 | Schultheis et al. |
| 2024/0016545 A1 | 1/2024 | Schultheis et al. |
| 2024/0023813 A1 | 1/2024 | Milner |
| 2024/0032995 A1 | 2/2024 | Schultheis et al. |
| 2024/0033002 A1 | 2/2024 | Cook |
| 2024/0041520 A1 | 2/2024 | Schultheis et al. |
| 2024/0050170 A1 | 2/2024 | Fournier |
| 2024/0050696 A1 | 2/2024 | Japuntich |
| 2024/0058060 A1 | 2/2024 | Cook |
| 2024/0065711 A1 | 2/2024 | Hendrickson |
| 2024/0065712 A1 | 2/2024 | Schultheis |
| 2024/0099773 A1 | 3/2024 | Schabert |
| 2024/0122648 A1 | 4/2024 | Cook |
| 2024/0165658 A1 | 5/2024 | Fu |
| 2024/0173044 A1 | 5/2024 | Chen et al. |
| 2024/0173526 A1 | 5/2024 | Kofidis |
| 2024/0189543 A1 | 6/2024 | Salinas |
| 2024/0216062 A1 | 7/2024 | Cook |
| 2024/0260981 A1 | 8/2024 | Betelia |
| 2024/0260982 A1 | 8/2024 | Peterson |
| 2024/0277410 A1 | 8/2024 | Cook |
| 2024/0277974 A1 | 8/2024 | Oehler |
| 2024/0277980 A1 | 8/2024 | O'Neill |
| 2024/0285296 A1 | 8/2024 | Vo |
| 2024/0285922 A1 | 8/2024 | Chu |
| 2024/0299051 A1 | 9/2024 | Sidhu et al. |
| 2024/0307119 A1 | 9/2024 | Nguyen |
| 2024/0325045 A1 | 10/2024 | Otake |
| 2024/0382258 A1 | 11/2024 | Schultheis |
| 2025/0025237 A1 | 1/2025 | Cook |
| 2025/0040947 A1 | 2/2025 | Schultheis |

FOREIGN PATENT DOCUMENTS

| | | |
|---|---|---|
| CN | 114053552 | 2/2022 |
| CN | 115175625 | 10/2022 |
| DE | 10230626 | 1/2004 |
| EP | 1453566 | 9/2008 |
| EP | 3266487 | 1/2018 |
| EP | 2879607 | 2/2019 |
| EP | 3240603 | 5/2019 |
| EP | 3240494 | 3/2021 |
| EP | 3960099 | 3/2022 |
| EP | 4129213 | 2/2023 |
| EP | 3182931 | 6/2024 |
| EP | 3950036 | 8/2024 |
| JP | H09117407 | 5/1997 |
| JP | 2001520070 | 10/2001 |
| JP | 2004519296 | 7/2004 |
| JP | 2008506447 | 3/2008 |
| JP | 2008083273 | 4/2008 |
| JP | 2009519777 | 5/2009 |
| JP | 2009213589 | 9/2009 |
| JP | 2011524203 | 9/2011 |
| JP | 4805208 | 11/2011 |
| JP | 4808620 | 11/2011 |
| JP | 2012505050 | 3/2012 |
| JP | 2014123147 | 7/2014 |
| JP | A2014516614 | 7/2014 |
| JP | A2015522344 | 8/2015 |
| JP | 2015217215 | 12/2015 |
| JP | 2018538077 | 12/2018 |
| JP | 2024511710 | 3/2024 |
| KR | 20180054041 | 5/2018 |
| WO | WO9208515 | 5/1992 |
| WO | WO9524867 | 9/1995 |
| WO | WO2012042619 | 4/2012 |
| WO | WO2012058156 | 5/2012 |
| WO | WO2014138582 | 9/2014 |
| WO | WO2016014999 | 1/2016 |
| WO | WO2016098670 | 6/2016 |
| WO | WO2016143556 | 9/2016 |
| WO | WO2018175322 | 9/2018 |
| WO | WO2022183075 | 9/2022 |
| WO | WO2023107334 | 6/2023 |
| WO | WO2024079108 | 4/2024 |
| WO | WO2024107418 | 5/2024 |

OTHER PUBLICATIONS

Definition of ablation—NCI Dictionary of Cancer Terms—NCI, National Cancer Institute, p. 1 (Year:2025).
Daemen, J., Tovar Forero, M.N, "The Coronary Intravascular Lithotripsy System", ICR Journal, 2019; 14(3); 174-181.
Butt, N., Khalid, N., Shlofmitz, E., "Intravascular Lithotripsy"; NCBI Bookshelf. A service of the National Library of Medicine, National Institutes of Health; StatPearls Publishing, 2023.
Shen, Yajie et al. "High-peak-power and narrow-linewidth Q-switched Ho: YAG laser in-band pumped at 1931 nm." Applied Physics Express 13.5 (2020): 052006. (Year 2020).

* cited by examiner

OPTICAL CONNECTOR ASSEMBLY FOR INTRAVASCULAR LITHOTRIPSY DEVICE

RELATED APPLICATION

This application is related to and claims priority on U.S. Provisional Patent Application Ser. No. 63/326,844, filed on Apr. 2, 2022 and entitled "OPTICAL CONNECTOR ASSEMBLY FOR INTRAVASCULAR LITHOTRIPSY DEVICE". To the extent permissible, the contents of U.S. Provisional Application Ser. No. 63/326,844, are incorporated in its entirety herein by reference.

BACKGROUND

Vascular lesions within vessels in the body can be associated with an increased risk for major adverse events, such as myocardial infarction, embolism, deep vein thrombosis, stroke, and the like. Severe vascular lesions, such as severely calcified vascular lesions, can be difficult to treat and achieve patency for a physician in a clinical setting.

Vascular lesions may be treated using interventions such as drug therapy, balloon angioplasty, atherectomy, stent placement, vascular graft bypass, to name a few. Such interventions may not always be ideal or may require subsequent treatment to address the lesion.

Intravascular lithotripsy is one method that has been recently used with some success for breaking up vascular lesions within vessels in the body. Intravascular lithotripsy utilizes a combination of pressure waves and bubble dynamics that are generated intravascularly in a fluid-filled balloon catheter. In particular, during an intravascular lithotripsy treatment, a high energy source is used to generate plasma and ultimately pressure waves as well as a rapid bubble expansion within a fluid-filled balloon to crack calcification at a treatment site within the vasculature that includes one or more vascular lesions. The associated rapid bubble formation from the plasma initiation and resulting localized fluid velocity within the balloon transfers mechanical energy through the incompressible fluid to impart a fracture force on the intravascular calcium, which is opposed to the balloon wall. The rapid change in fluid momentum upon hitting the balloon wall is known as hydraulic shock, or water hammer.

There is an ongoing desire to enhance vessel patency and optimization of therapy delivery parameters within an intravascular lithotripsy catheter system in a manner that is relatively easy to control and is consistently manufacturable.

SUMMARY

The present invention is directed toward a catheter system for placement within a blood vessel having a vessel wall. The catheter system can be used by a user for treating a treatment site within or adjacent to the vessel wall within a body of a patient. In various embodiments, the catheter system includes a system console, one or more energy guides, and an optical connector assembly. The system console includes an energy source and a console connection aperture. The one or more energy guides are configured to receive energy from the energy source. The optical connector assembly includes a guide coupling housing that retains at least a portion of each of the one or more energy guides. The guide coupling housing is configured to be mechanically connected to the system console with at least a portion of the guide coupling housing being configured to fit and be selectively retained within the console connection aperture so that the one or more energy guides are adjustably and more precisely aligned within the guide coupling housing and relative to the energy from the energy source to receive the energy from the energy source.

In some embodiments, the optical connector assembly further includes a plurality of ferrules, and each of the plurality of ferrules is configured to retain a portion of one of the one or more energy guides.

In certain embodiments, the optical connector assembly further includes a ferrule housing having a plurality of positioning apertures that are each configured to retain at least a portion of one of the plurality of ferrules spaced apart from one another. Each of the plurality of positioning apertures can be larger than a diameter of the ferrule that is retained therein to allow the ferrule to move relative to the positioning aperture.

In some embodiments, the optical connector assembly further includes a position compensator that is configured to provide a spring force to keep the ferrules in an aligned position relative to the console connection aperture while still allowing the ferrules to move relative to the ferrule housing.

In certain embodiments, the ferrule housing is adjustably positioned within the guide coupling housing so that the ferrule housing is movable relative to the guide coupling housing.

In some embodiments, the optical connector assembly further includes a resilient plate that is configured to control movement of the ferrule housing within the guide coupling housing.

In certain embodiments, the guide coupling housing includes a console facing side, and the plurality of ferrules are recessed from the console facing side of the guide coupling housing.

In some embodiments, the guide coupling housing defines a housing cavity therein, and each of the plurality of ferrules, the ferrule housing, the position compensator, and the resilient plate are retained within the housing cavity.

In certain embodiments, the guide coupling housing is formed from a first housing member and a second housing member that are selectively connected together to form the guide coupling housing and to define the housing cavity therein.

In some embodiments, the optical connector assembly further includes a sealing member that seals the connection between the guide coupling housing and the console connection aperture.

In one embodiment, the sealing member is in the form of a face gasket.

In certain embodiments, the optical connector assembly further includes a contaminant inhibitor that is positionable about at least a portion of the guide coupling housing, the contaminant inhibitor being configured to inhibit dust and particulates from contaminating a face of each of the one or more energy guides.

In one embodiment, the contaminant inhibitor is disposable.

In some embodiments, the optical connector assembly further includes a locking mechanism that is configured to selectively lock the guide coupling housing in position when the guide coupling housing is being retained within the console connection aperture.

In certain embodiments, the system console further includes an optical sensor and an actuator; and wherein the optical sensor is configured to sense a position of the guide coupling housing relative to the console connection aperture, and is further configured to initiate the actuator that mechanically draws the guide coupling housing into place within the console connection aperture.

In some embodiments, the optical connector assembly further includes a guide bundler that is configured to provide strain relief while bringing the one or more energy guides together to form an energy guide bundle.

In certain embodiments, the guide bundler includes a shaft jacket within which all of the one or more energy guides are retained as the energy guide bundle.

In one embodiment, the guide bundler further includes a locking crimp that is configured to tightly bunch the one or more energy guides together to form the energy guide bundle.

In various embodiments, the catheter system further includes a balloon that is configured to be positioned substantially adjacent to the treatment site, the balloon including a balloon wall that defines a balloon interior, the balloon being configured to retain a catheter fluid within the balloon interior.

In some embodiments, the balloon is selectively inflatable with the catheter fluid to expand to an inflated state, wherein when the balloon is in the inflated state the balloon wall is configured to be positioned substantially adjacent to the treatment site.

In certain embodiments, each of the one or more energy guides includes a guide distal end that is configured to be positioned within the balloon interior.

In some embodiments, each of the one or more energy guides is configured to guide the energy from the energy source through the energy guide and into the balloon interior.

In certain embodiments, each of the one or more energy guides guiding the energy from the energy source into the balloon interior generates a plasma bubble in the catheter fluid within the balloon interior.

In some embodiments, energy from the plasma bubble is directed toward a portion of the balloon wall that is positioned substantially adjacent to the treatment site.

In certain embodiments, each of the one or more energy guides generates one or more pressure waves in the catheter fluid that impart a force upon the treatment site.

In many embodiments, at least one of the one or more energy guides includes an optical fiber.

In various embodiments, the energy source includes a laser.

In other embodiments, the energy source is a high voltage energy source that provides pulses of high voltage.

In some embodiments, at least one of the one or more energy guides includes an electrode pair including spaced apart electrodes that extend into the balloon interior, and pulses of high voltage from the energy source are applied to the electrodes and form an electrical arc across the electrodes.

The present invention is further directed toward a method for treating a treatment site within or adjacent to a blood vessel within a body of a patient, including the steps of providing a system console including an energy source and a console connection aperture; receiving energy from the energy source with one or more energy guides; retaining at least a portion of each of the one or more energy guides with a guide coupling housing of an optical connector assembly; and mechanically connecting the guide coupling housing to the system console with at least a portion of the guide coupling housing being configured to fit and be selectively retained within the console connection aperture so that the one or more energy guides are adjustably and more precisely aligned within the guide coupling housing and relative to the energy from the energy source to receive the energy from the energy source.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Treatment of vascular lesions can reduce major adverse events or death in affected subjects. As referred to herein, a major adverse event is one that can occur anywhere within the body due to the presence of a vascular lesion. Major adverse events can include, but are not limited to, major adverse cardiac events, major adverse events in the peripheral or central vasculature, major adverse events in the brain, major adverse events in the musculature, or major adverse events in any of the internal organs.

As used herein, the terms "treatment site", "intravascular lesion" and "vascular lesion" can be used interchangeably unless otherwise noted. As such, the intravascular lesions and/or the vascular lesions are sometimes referred to herein simply as "lesions".

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It is appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is recognized that such a development effort might be complex and time-consuming, but would nevertheless be a routine undertaking of engineering for those of ordinary skill in the art having the benefit of this disclosure.

Figure 1:
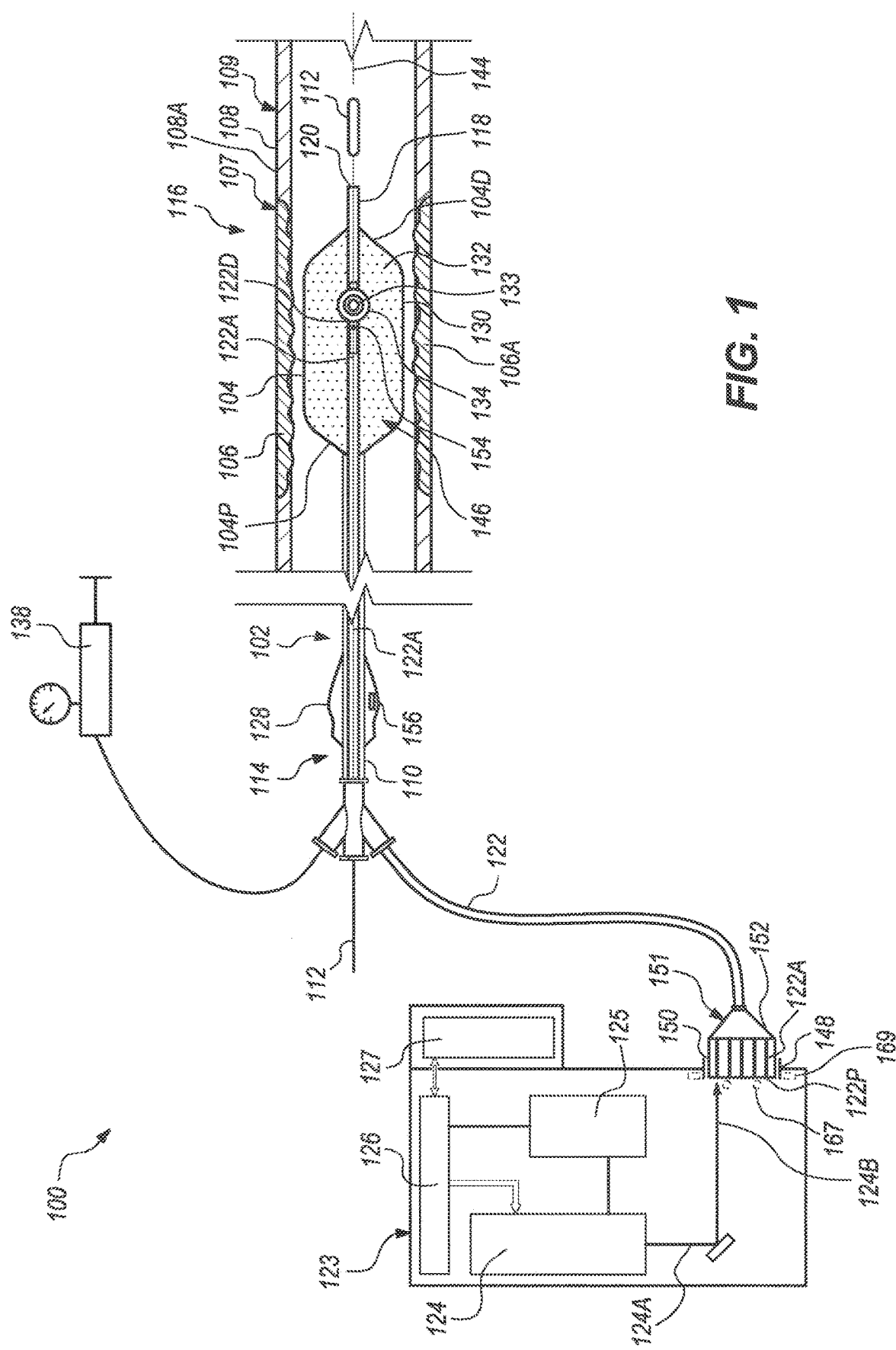
FIG. 1 is a simplified schematic cross-sectional view illustration of an embodiment of a catheter system in accordance with various embodiments.

The catheter systems disclosed herein can include many different forms. Referring now to FIG. 1, a simplified schematic cross-sectional view illustration is shown of a catheter system 100 in accordance with various embodiments. The catheter system 100 is suitable for imparting pressure waves to induce fractures in one or more vascular lesions within or adjacent a vessel wall of a blood vessel or on or adjacent to a heart valve within a body of a patient. In the embodiment illustrated in FIG. 1, the catheter system 100 can include one or more of a catheter 102, an energy guide bundle 122 including one or more energy guides 122A, a system console 123 including one or more of an energy source 124, a power source 125, a system controller 126, and a graphic user interface 127 (a "GUI"), a handle assembly 128, and a fluid pump 138. Alternatively, the catheter system 100 can include more components or fewer components than those specifically illustrated and described in relation to FIG. 1.

The catheter 102 is configured to move to the treatment site 106 within or adjacent to a vessel wall 108A of a blood vessel 108 within a body 107 of a patient 109. The treatment site 106 can include one or more vascular lesions 106A such as calcified vascular lesions, for example. Additionally, or in the alternative, the treatment site 106 can include vascular lesions 106A such as fibrous vascular lesions. Still alternatively, in some implementations, the catheter 102 can be used at a treatment site 106 within or adjacent to a heart valve within the body 107 of the patient 109.

The catheter 102 can include an inflatable balloon 104 (sometimes referred to herein simply as a "balloon"), a catheter shaft 110, and a guidewire 112. The balloon 104 can be coupled to the catheter shaft 110. The balloon 104 can include a balloon proximal end 104P and a balloon distal end 104D. The catheter shaft 110 can extend from a proximal portion 114 of the catheter system 100 to a distal portion 116 of the catheter system 100. The catheter shaft 110 can include a longitudinal axis 144. The catheter 102 and/or the catheter shaft 110 can also include a guidewire lumen 118 which is configured to move over the guidewire 112. As utilized herein, the guidewire lumen 118 defines a conduit through which the guidewire 112 extends. The catheter shaft 110 can further include an inflation lumen (not shown) and/or various other lumens for various other purposes. In some embodiments, the catheter 102 can have a distal end opening 120 and can accommodate and be tracked over the guidewire 112 as the catheter 102 is moved and positioned at or near the treatment site 106. In some embodiments, the balloon proximal end 104P can be coupled to the catheter shaft 110, and the balloon distal end 104D can be coupled to the guidewire lumen 118.

The balloon 104 includes a balloon wall 130 that defines a balloon interior 146. The balloon 104 can be selectively inflated with a catheter fluid 132 to expand from a deflated state suitable for advancing the catheter 102 through a patient's vasculature, to an inflated state (as shown in FIG. 1) suitable for anchoring the catheter 102 in position relative to the treatment site 106. Stated in another manner, when the balloon 104 is in the inflated state, the balloon wall 130 of the balloon 104 is configured to be positioned substantially adjacent to the treatment site 106. It is appreciated that although FIG. 1 illustrates the balloon wall 130 of the balloon 104 being shown spaced apart from the treatment site 106 of the blood vessel 108 when in the inflated state, this is done for ease of illustration. It is recognized that the balloon wall 130 of the balloon 104 will typically be substantially directly adjacent to and/or abutting the treatment site 106 when the balloon 104 is in the inflated state.

The balloon 104 suitable for use in the catheter system 100 includes those that can be passed through the vasculature of a patient 109 when in the deflated state. In some embodiments, the balloons 104 are made from silicone. In other embodiments, the balloon 104 can be made from materials such as polydimethylsiloxane (PDMS), polyurethane, polymers such as PEBAX™ material, nylon, or any other suitable material.

The balloon 104 can have any suitable diameter (in the inflated state). In various embodiments, the balloon 104 can have a diameter (in the inflated state) ranging from less than one millimeter (mm) up to 25 mm. In some embodiments, the balloon 104 can have a diameter (in the inflated state) ranging from at least 1.5 mm up to 14 mm. In some embodiments, the balloon 104 can have a diameter (in the inflated state) ranging from at least two mm up to five mm.

In some embodiments, the balloon 104 can have a length ranging from at least three mm to 300 mm. More particularly, in some embodiments, the balloon 104 can have a length ranging from at least eight mm to 200 mm. It is appreciated that a balloon 104 having a relatively longer length can be positioned adjacent to larger treatment sites 106, and, thus, may be usable for imparting pressure waves onto and inducing fractures in larger vascular lesions 106A or multiple vascular lesions 106A at precise locations within the treatment site 106. It is further appreciated that a longer balloon 104 can also be positioned adjacent to multiple treatment sites 106 at any one given time.

In some embodiments, the balloon 104 can include a drug eluting coating or a drug eluting stent structure. The drug eluting coating or drug eluting stent can include one or more therapeutic agents including anti-inflammatory agents, anti-neoplastic agents, anti-angiogenic agents, and the like.

The catheter fluid 132 can be a fluid, such as a liquid or a gas. Some examples of the catheter fluid 132 suitable for use can include, but are not limited to one or more of water, saline, contrast medium, fluorocarbons, perfluorocarbons, gases, such as carbon dioxide, or any other suitable catheter fluid 132.

The catheter shaft 110 of the catheter 102 can be coupled to the one or more energy guides 122A of the energy guide bundle 122 that are in optical communication with the energy source 124. The energy guide(s) 122A can be disposed along the catheter shaft 110 and within the balloon 104. In some embodiments, each energy guide 122A can be an optical fiber and the energy source 124 can be a laser. The energy source 124 can be in optical communication with the energy guides 122A at the proximal portion 114 of the catheter system 100.

In some embodiments, the catheter shaft 110 can be coupled to multiple energy guides 122A such as a first energy guide, a second energy guide, a third energy guide, etc., which can be disposed at any suitable positions about and/or relative to the guidewire lumen 118 and/or the catheter shaft 110. For example, in certain non-exclusive embodiments, two energy guides 122A can be spaced apart by approximately 180 degrees about the circumference of the guidewire lumen 118 and/or the catheter shaft 110; three energy guides 122A can be spaced apart by approximately 120 degrees about the circumference of the guidewire lumen 118 and/or the catheter shaft 110; four energy guides 122A can be spaced apart by approximately 90 degrees about the circumference of the guidewire lumen 118 and/or the catheter shaft 110; six energy guides 122A can be spaced apart by approximately 60 degrees about the circumference of the guidewire lumen 118 and/or the catheter shaft 110; eight energy guides 122A can be spaced apart by approximately 45 degrees about the circumference of the guidewire lumen 118 and/or the catheter shaft 110; or ten energy guides 122A can be spaced apart by approximately 36 degrees about the circumference of the guidewire lumen 118 and/or the catheter shaft 110. Still alternatively, multiple energy guides 122A need not be uniformly spaced apart from one another about the circumference of the guidewire lumen 118 and/or the catheter shaft 110. More particularly, it is further appreciated that the energy guides 122A can be disposed uniformly or non-uniformly about the guidewire lumen 118 and/or the catheter shaft 110 to achieve the desired effect in the desired locations.

The catheter system 100 and/or the energy guide bundle 122 can include any number of energy guides 122A in optical communication with the energy source 124 at the proximal portion 114, and with the catheter fluid 132 within the balloon interior 146 of the balloon 104 at the distal portion 116. For example, in some embodiments, the catheter system 100 and/or the energy guide bundle 122 can include from one energy guide 122A to greater than 30 energy guides 122A. Alternatively, in other embodiments, the catheter system 100 and/or the energy guide bundle 122 can include greater than 30 energy guides 122A.

The energy guides 122A can have any suitable design for purposes of generating plasma and/or pressure waves in the catheter fluid 132 within the balloon interior 146. Thus, the general description of the energy guides 122A as light guides is not intended to be limiting in any manner, except for as set forth in the claims appended hereto. More particularly, although the catheter systems 100 are often described with the energy source 124 as a light source and the one or more energy guides 122A as light guides, the catheter system 100 can alternatively include any suitable energy source 124 and energy guides 122A for purposes of generating the desired plasma in the catheter fluid 132 within the balloon interior 146. For example, in one non-exclusive alternative embodiment, the energy source 124 can be configured to provide high voltage pulses, and each energy guide 122A can include an electrode pair including spaced apart electrodes that extend into the balloon interior 146. In such embodiment, each pulse of high voltage is applied to the electrodes and forms an electrical arc across the electrodes, which, in turn, generates the plasma and forms the pressure waves in the catheter fluid 132 that are utilized to provide the fracture force onto the vascular lesions 106A at the treatment site 106. Still alternatively, the energy source 124 and/or the energy guides 122A can have another suitable design and/or configuration.

In certain embodiments, the energy guides 122A can include an optical fiber or flexible light pipe. The energy guides 122A can be thin and flexible and can allow light signals to be sent with very little loss of strength. The energy guides 122A can include a core surrounded by a cladding about its circumference. In some embodiments, the core can be a cylindrical core or a partially cylindrical core. The core and cladding of the energy guides 122A can be formed from one or more materials, including but not limited to one or more types of glass, silica, or one or more polymers. The energy guides 122A may also include a protective coating, such as a polymer. It is appreciated that the index of refraction of the core will be greater than the index of refraction of the cladding.

Each energy guide 122A can guide energy along its length between a guide proximal end 122P and a guide distal end 122D that is positioned within the balloon interior 146.

The energy guides 122A can assume many configurations about and/or relative to the catheter shaft 110 of the catheter 102. In some embodiments, the energy guides 122A can run parallel to the longitudinal axis 144 of the catheter shaft 110. In some embodiments, the energy guides 122A can be physically coupled to the catheter shaft 110. In other embodiments, the energy guides 122A can be disposed along a length of an outer diameter of the catheter shaft 110. In yet other embodiments, the energy guides 122A can be disposed within one or more energy guide lumens within the catheter shaft 110.

The energy guides 122A can also be disposed at any suitable positions about the circumference of the guidewire lumen 118 and/or the catheter shaft 110. The guide distal end 122D of each of the energy guides 122A can be disposed at any suitable longitudinal position relative to the length of the balloon 104 and/or relative to the length of the guidewire lumen 118 to more effectively and more precisely impart pressure waves for purposes of disrupting the vascular lesions 106A at the treatment site 106.

In certain embodiments, the energy guides 122A can include one or more photoacoustic transducers 154, where each photoacoustic transducer 154 can be in optical communication with the energy guide 122A within which it is disposed. In some embodiments, the photoacoustic transducers 154 can be in optical communication with the guide distal end 122D of the energy guide 122A. In such embodiments, the photoacoustic transducers 154 can have a shape that corresponds with and/or conforms to the guide distal end 122D of the energy guide 122A.

The photoacoustic transducer 154 is configured to convert light energy into an acoustic wave at or near the guide distal end 122D of the energy guide 122A. The direction of the acoustic wave can be tailored by changing an angle of the guide distal end 122D of the energy guide 122A.

In certain embodiments, the photoacoustic transducers 154 disposed at the guide distal end 122D of the energy guide 122A can assume the same shape as the guide distal end 122D of the energy guide 122A. For example, in certain non-exclusive embodiments, the photoacoustic transducer 154 and/or the guide distal end 122D can have a conical shape, a convex shape, a concave shape, a bulbous shape, a square shape, a stepped shape, a half-circle shape, an ovoid shape, and the like. The energy guide 122A can further include additional photoacoustic transducers 154 disposed along one or more side surfaces of the length of the energy guide 122A.

In some embodiments, the energy guides 122A can further include one or more diverting features or "diverters" (not shown in FIG. 1), such as within the energy guide 122A and/or near the guide distal end 122D of the energy guide 122A, that are configured to direct energy from the energy guide 122A toward a side surface which can be located at or near the guide distal end 122D of the energy guide 122A, before the energy is directed toward the balloon wall 130. A diverting feature can include any feature of the system that diverts energy from the energy guide 122A away from its axial path toward a side surface of the energy guide 122A. The energy guides 122A can each include one or more optical windows disposed along the longitudinal or circumferential surfaces of each energy guide 122A and in optical communication with a diverting feature. Stated in another manner, the diverting features can be configured to direct energy in the energy guide 122A toward a side surface that is at or near the guide distal end 122D, where the side surface is in optical communication with an optical window. The optical windows can include a portion of the energy guide 122A that allows energy to exit the energy guide 122A from within the energy guide 122A, such as a portion of the energy guide 122A lacking a cladding material on or about the energy guide 122A.

Examples of the diverting features suitable for use include a reflecting element, a refracting element, and a fiber diffuser. The diverting features suitable for focusing energy away from the tip of the energy guides 122A can include, but are not to be limited to, those having a convex surface, a gradient-index (GRIN) lens, and a mirror focus lens. Upon contact with the diverting feature, the energy is diverted within the energy guide 122A to one or more of a plasma generator 133 and the photoacoustic transducer 154 that is in optical communication with a side surface of the energy guide 122A. When utilized, the photoacoustic transducer 154 then converts light energy into an acoustic wave that extends away from the side surface of the energy guide 122A.

As noted above, in the embodiment illustrated in FIG. 1, the system console 123 can include one or more of the energy source 124, the power source 125, the system controller 126, and the GUI 127. Alternatively, the system console 123 can include greater or fewer components than those specifically illustrated in FIG. 1. For example, in certain non-exclusive alternative embodiments, the system console 123 can be designed without the GUI 127. Still alternatively, one or more of the energy source 124, the power source 125, the system controller 126, and the GUI 127 can be provided at any suitable location within the catheter system 100, including outside of or remotely from the system console 123.

The system console 123 and the components included therewith can be operatively coupled to the catheter 102, the energy guide bundle 122, and/or the remainder of the catheter system 100. For example, in some embodiments, as illustrated in FIG. 1, the system console 123 can include a console connection aperture 148 (also sometimes referred to generally as a "socket" or a "console receptacle") by which the energy guide bundle 122 is mechanically coupled to the system console 123. In such embodiments, the energy guide bundle 122 can include an optical connector assembly 151 having a guide coupling housing 150 (also sometimes referred to generally as a "connector housing") that houses a portion, such as the guide proximal end 122P, of each of the energy guides 122A. At least a portion of the guide coupling housing 150 is configured to fit and be selectively retained within the console connection aperture 148 to provide the mechanical coupling between the energy guide bundle 122 and the system console 123.

As described in greater detail herein, in various embodiments, the optical connector assembly 151 is configured to ensure proper alignment and coupling of the energy guide bundle 122 and/or each of the one or more energy guides 122A to the system console 123 so that energy from the energy source 124 is more precisely and accurately directed into the guide proximal end 122P of each of the one or more energy guides 122A before such energy is guided by the one or more energy guides 122A into the balloon interior 146. As further described herein below, the system console 123 can also be configured to include certain features or components, such as at least one optical sensor 167 that is usable in conjunction with at least one actuator 169, that further enable the precise alignment and coupling of the energy bundle 122 and/or each of the one or more energy guides 122A to the system console 123 and/or energy from the energy source 124 that is retained therein.

The energy guide bundle 122 and/or the optical connector assembly 151 can also include a guide bundler 152 (or "shell") that provides strain relief as it brings each of the individual energy guides 122A closer together so that the energy guides 122A and/or the energy guide bundle 122 can be in a more compact form as it extends with the catheter 102 into the blood vessel 108 during use of the catheter system 100.

The energy source 124 can be selectively and/or alternatively coupled in optical communication with each of the energy guides 122A, such as to the guide proximal end 122P of each of the energy guides 122A, in the energy guide bundle 122. In particular, the energy source 124 is configured to generate energy in the form of a source beam 124A, such as a pulsed source beam, that can be selectively and/or alternatively directed to and received by each of the properly aligned energy guides 122A in the energy guide bundle 122 as an individual guide beam 124B. Alternatively, the catheter system 100 can include more than one energy source 124. For example, in one non-exclusive alternative embodiment, the catheter system 100 can include a separate energy source 124 for each of the energy guides 122A in the energy guide bundle 122.

The energy source 124 can have any suitable design. In certain embodiments, the energy source 124 can be configured to provide sub-millisecond pulses of energy from the energy source 124 that are focused onto a small spot in order to couple it into the guide proximal end 122P of the energy guide 122A. Such pulses of energy are then directed and/or guided along the energy guides 122A to a location within the balloon interior 146 of the balloon 104, thereby inducing plasma formation in the catheter fluid 132 within the balloon interior 146 of the balloon 104, such as via the plasma generator 133 that can be located at or near the guide distal end 122D of the energy guide 122A. In particular, in such embodiments, the energy emitted at the guide distal end 122D of the energy guide 122A is directed toward and energizes the plasma generator 133 to form the plasma in the catheter fluid 132 within the balloon interior 146. The plasma formation causes rapid bubble formation, and imparts pressure waves upon the treatment site 106. An exemplary plasma-induced bubble 134 is illustrated in FIG. 1.

In various non-exclusive alternative embodiments, the sub-millisecond pulses of energy from the energy source 124 can be delivered to the treatment site 106 at a frequency of between approximately one hertz (Hz) and 5000 Hz, between approximately 30 Hz and 1000 Hz, between approximately ten Hz and 100 Hz, or between approximately one Hz and 30 Hz. Alternatively, the sub-millisecond pulses of energy can be delivered to the treatment site 106 at a frequency that can be greater than 5000 Hz or less than one Hz, or any other suitable range of frequencies.

It is appreciated that although the energy source 124 is typically utilized to provide pulses of energy, the energy source 124 can still be described as providing a single source beam 124A, i.e. a single pulsed source beam.

The energy sources 124 suitable for use can include various types of light sources including lasers and lamps. Alternatively, the energy sources 124 can include any suitable type of energy source.

Suitable lasers can include short pulse lasers on the sub-millisecond timescale. In some embodiments, the energy source 124 can include lasers on the nanosecond (ns) timescale. The lasers can also include short pulse lasers on the picosecond (ps), femtosecond (fs), and microsecond (us) timescales. It is appreciated that there are many combinations of laser wavelengths, pulse widths and energy levels that can be employed to achieve plasma in the catheter fluid 132 of the catheter 102. In various non-exclusive alternative embodiments, the pulse widths can include those falling within a range including from at least ten ns to 3000 ns, at least 20 ns to 100 ns, or at least one ns to 500 ns. Alternatively, any other suitable pulse width range can be used.

Exemplary nanosecond lasers can include those within the UV to IR spectrum, spanning wavelengths of about ten nanometers (nm) to one millimeter (mm). In some embodiments, the energy sources 124 suitable for use in the catheter systems 100 can include those capable of producing light at wavelengths of from at least 750 nm to 2000 nm. In other embodiments, the energy sources 124 can include those capable of producing light at wavelengths of from at least 700 nm to 3000 nm. In still other embodiments, the energy sources 124 can include those capable of producing light at wavelengths of from at least 100 nm to ten micrometers (μm). Nanosecond lasers can include those having repetition rates of up to 200 kHz.

In some embodiments, the laser can include a Q-switched thulium:yttrium-aluminum-garnet (Tm:YAG) laser. In other embodiments, the laser can include a neodymium:yttrium-aluminum-garnet (Nd:YAG) laser, holmium:yttrium-aluminum-garnet (Ho:YAG) laser, erbium:yttrium-aluminum-garnet (Er:YAG) laser, excimer laser, helium-neon laser, carbon dioxide laser, as well as doped, pulsed, fiber lasers.

In certain embodiments, the energy source 124 can include a plurality of lasers that are grouped together in series. In yet other embodiments, the energy source 124 can include one or more low energy lasers that are fed into a high energy amplifier, such as a master oscillator power amplifier (MOPA). In still yet other embodiments, the energy source 124 can include a plurality of lasers that can be combined in parallel or in series to provide the energy needed to create the plasma bubble 134 in the catheter fluid 132.

The catheter system 100 can generate pressure waves having maximum pressures in the range of at least one megapascal (MPa) to 100 MPa. The maximum pressure generated by a particular catheter system 100 will depend on the energy source 124, the absorbing material, the bubble expansion, the propagation medium, the balloon material, and other factors. In various non-exclusive alternative embodiments, the catheter systems 100 can generate pressure waves having maximum pressures in the range of at least approximately two MPa to 50 MPa, at least approximately two MPa to 30 MPa, or approximately at least 15 MPa to 25 MPa.

The pressure waves can be imparted upon the treatment site 106 from a distance within a range from at least approximately 0.1 millimeters (mm) to greater than approximately 25 mm extending radially from the energy guides 122A when the catheter 102 is placed at the treatment site 106. In various non-exclusive alternative embodiments, the pressure waves can be imparted upon the treatment site 106 from a distance within a range from at least approximately ten mm to 20 mm, at least approximately one mm to ten mm, at least approximately 1.5 mm to four mm, or at least approximately 0.1 mm to ten mm extending radially from the energy guides 122A when the catheter 102 is placed at the treatment site 106. In other embodiments, the pressure waves can be imparted upon the treatment site 106 from another suitable distance that is different than the foregoing ranges. In some embodiments, the pressure waves can be imparted upon the treatment site 106 within a range of at least approximately two MPa to 30 MPa at a distance from at least approximately 0.1 mm to ten mm. In some embodiments, the pressure waves can be imparted upon the treatment site 106 from a range of at least approximately two MPa to 25 MPa at a distance from at least approximately 0.1 mm to ten mm. Still alternatively, other suitable pressure ranges and distances can be used.

The power source 125 is electrically coupled to and is configured to provide necessary power to each of the energy source 124, the system controller 126, the GUI 127, and the handle assembly 128. The power source 125 can have any suitable design for such purposes.

The system controller 126 is electrically coupled to and receives power from the power source 125. The system controller 126 is coupled to and is configured to control operation of each of the energy source 124 and the GUI 127. The system controller 126 can include one or more processors or circuits for purposes of controlling the operation of at least the energy source 124 and the GUI 127. For example, the system controller 126 can control the energy source 124 for generating pulses of energy as desired and/or at any desired firing rate.

The system controller 126 can also be configured to control operation of other components of the catheter system 100 such as the positioning of the catheter 102 adjacent to the treatment site 106, the inflation of the balloon 104 with the catheter fluid 132, etc. Further, or in the alternative, the catheter system 100 can include one or more additional controllers that can be positioned in any suitable manner for purposes of controlling the various operations of the catheter system 100. For example, in certain embodiments, an additional controller and/or a portion of the system controller 126 can be positioned and/or incorporated within the handle assembly 128.

The GUI 127 is accessible by the user or operator of the catheter system 100. The GUI 127 is electrically connected to the system controller 126. With such design, the GUI 127 can be used by the user or operator to ensure that the catheter system 100 is effectively utilized to impart pressure onto and induce fractures into the vascular lesions 106A at the treatment site 106. The GUI 127 can provide the user or operator with information that can be used before, during and after use of the catheter system 100. In one embodiment, the GUI 127 can provide static visual data and/or information to the user or operator. In addition, or in the alternative, the GUI 127 can provide dynamic visual data and/or information to the user or operator, such as video data or any other data that changes over time during use of the catheter system 100. In various embodiments, the GUI 127 can include one or more colors, different sizes, varying brightness, etc., that may act as alerts to the user or operator. Additionally, or in the alternative, the GUI 127 can provide audio data or information to the user or operator. The specifics of the GUI 127 can vary depending upon the design requirements of the catheter system 100, or the specific needs, specifications and/or desires of the user or operator.

As shown in FIG. 1, the handle assembly 128 can be positioned at or near the proximal portion 114 of the catheter system 100. In this embodiment, the handle assembly 128 is coupled to the balloon 104 and is positioned spaced apart from the balloon 104. Alternatively, the handle assembly 128 can be positioned at another suitable location.

The handle assembly 128 is attached to the catheter shaft 110 and is handled and used by the user or operator to operate, position and control the catheter 102. The design and specific features of the handle assembly 128 can vary to suit the design requirements of the catheter system 100. In the embodiment illustrated in FIG. 1, the handle assembly 128 is separate from, but in electrical and/or fluid communication with one or more of the system controller 126, the energy source 124, the fluid pump 138, and the GUI 127.

In some embodiments, the handle assembly 128 can integrate and/or include at least a portion of the system controller 126 within an interior of the handle assembly 128. For example, as shown, in certain such embodiments, the handle assembly 128 can include circuitry 156, which is electrically coupled between catheter electronics and the system console 123, and which can form at least a portion of the system controller 126. In one embodiment, the circuitry 156 can include a printed circuit board having one or more integrated circuits, or any other suitable circuitry. In an alternative embodiment, the circuitry 156 can be omitted, or can be included within the system controller 126, which in various embodiments can be positioned outside of the handle assembly 128, such as within the system console 123. It is understood that the handle assembly 128 can include fewer or additional components than those specifically illustrated and described herein.

The catheter system 100 can also include the fluid pump 138 that is configured to inflate the balloon 104 with the catheter fluid 132 as needed.

As with all embodiments illustrated and described herein, various structures may be omitted from the figures for clarity and ease of understanding. Further, the figures may include certain structures that can be omitted without deviating from the intent and scope of the invention.

Figure 2:
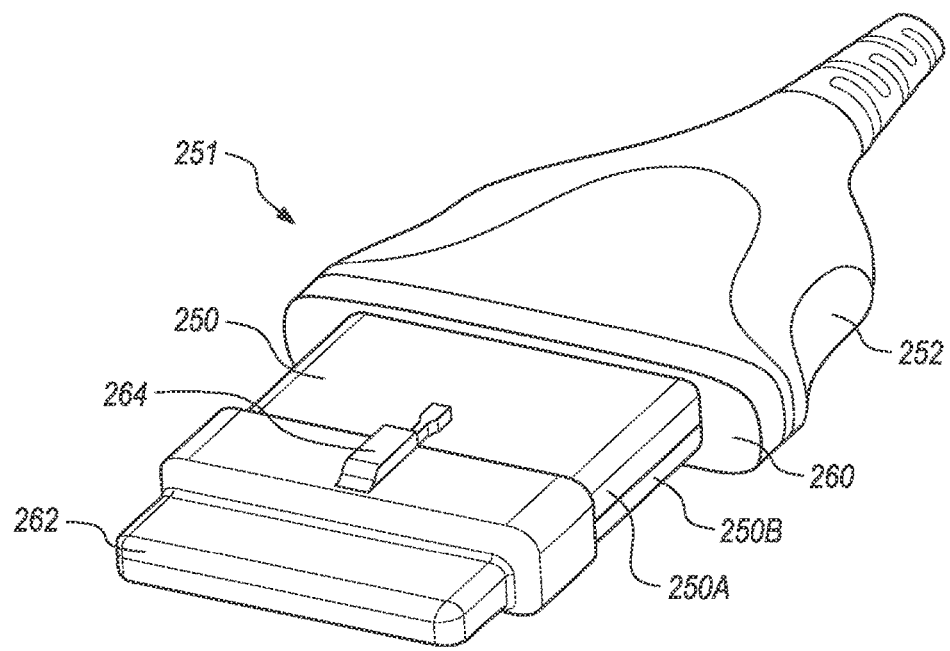
FIG. 2 is a simplified perspective view illustration of an embodiment of an optical connector assembly having features of the present invention that can be included as part of the catheter system of FIG. 1.

FIG. 2 is a simplified perspective view illustration of an embodiment of an optical connector assembly 251 having features of the present invention that can be included as part of the catheter system 100 of FIG. 1.

The design of the optical connector assembly 251 can be varied. As shown, FIG. 2 illustrates various external components and features that can be included in various embodiments of the optical connector assembly 251. In particular, as illustrated, the optical connector assembly 251 can include one or more of a guide coupling (or connector) housing 250, a guide bundler 252, a sealing member 260, a contaminant inhibitor 262, and a locking mechanism 264. Alternatively, the optical connector assembly 251 can include greater or fewer external components than those specifically noted.

The purpose of the optical connector assembly 251 is to provide a means to connect ferrules 366 (illustrated, for example, in FIG. 3) located within it, and thus the energy guides 122A (illustrated in FIG. 1) that are positioned at least partially within the ferrules 366, into the console connection aperture 148 (or "console receptacle", illustrated in FIG. 1). Thus, with the optical connector assembly 251, and the ferrules 366 and energy guides 122A retained at least partially therein, connected and aligned more precisely within the console connection aperture 148 of the system console 123 (illustrated in FIG. 1), energy from the energy source 124 (illustrated in FIG. 1) can be effectively and selectively coupled into each of the one or more energy guides 122A.

In various embodiments, the optical connector assembly 251 and/or the system console 123 (illustrated in FIG. 1) can include certain features or components to better ensure the more precisely aligned connection therebetween. For example, in some embodiments, the optical connector assembly 251 can include (i) the ferrules 366 that are allowed to float relative to and/or within a ferrule housing 370 (illustrated in FIG. 3) by the ferrule housing 370 having positioning apertures 476 (illustrated in FIG. 4) within which at least a portion of the ferrules 366 is retained that are slightly larger than the diameter of the ferrules 366; (ii) the ferrule housing 370 that is allowed to float relative to the guide coupling housing 250 by selectively moving the ferrule housing 370 (up-and-down and/or side-to-side) relative to the guide coupling housing 250 as necessary; (iii) a position compensator 374 (illustrated in FIG. 3) that is configured to provide a spring force to keep the ferrules 366 in an aligned position, while still allowing play within the ferrule housing 370; and (iv) a resilient plate 372 that is configured to control the floating of the ferrule housing 370 within the guide coupling housing 250. In certain embodiments, the system console 123 can include one or more of the optical sensors 167 (illustrated in FIG. 1) that are configured to sense a position of the optical connector assembly 251 and/or the guide coupling housing 250 relative to the system console 123 and/or the console connection aperture 148, and initiate the actuator 169 (illustrated in FIG. 1) that mechanically draws the optical connector assembly 251 more accurately into place within the console connection aperture 148.

During use of the catheter system 100, it is also desired to limit the amount of dust, fluids and/or other particulates that may otherwise contaminate a guide face of the guide proximal end 122P (illustrated in FIG. 1) of each of the one or more energy guides 122A.

The guide coupling housing 250 is configured to house a portion of each of the energy guides 122A, such as the guide proximal end 122P, and to fit and be selectively retained within the console connection aperture 148 to provide the mechanical coupling between the energy guide bundle 122 (illustrated in FIG. 1) and the system console 123. The design of the guide coupling housing 250 can be varied to suit the requirements of the catheter system 100 and/or the optical connector assembly 251. In certain embodiments, the guide coupling housing 250 can be formed from multiple housing members, such as a first housing member 250A and a second housing member 250B, that can be selectively coupled together to retain various internal components of the optical connector assembly 251 effectively within a housing cavity 368 (illustrated in FIG. 3) defined therein. In one embodiment, each of the first housing member 250A and the second housing member 250B can form one-half of the guide coupling housing 250 (such as a top half and a corresponding bottom half in one non-exclusive embodiment), with each half being substantially similar to the other half. It is appreciated that the housing members 250A, 250B can be selectively coupled together in any suitable manner. Alternatively, the guide coupling housing 250 can have another suitable design.

It is appreciated that the guide coupling housing 250 and/or the individual housing members 250A, 250B can be formed from any suitable materials that provide an effective housing to protect the various components retained therein. Various internal components of the optical connector assembly 251 are illustrated and described herein below in relation to FIG. 3.

The guide bundler 252 is configured to provide strain relief as it brings each of the individual energy guides 122A closer together so that the energy guides 122A and/or the energy guide bundle 122 can be in a more compact form as it extends with the catheter 102 (illustrated in FIG. 1) into the blood vessel 108 (illustrated in FIG. 1) during use of the catheter system 100. Certain internal components that can be included within the guide bundler 252 for purposes of providing strain relief as it brings the energy guides 122A closer together within the energy guide bundle 122 are illustrated and described herein below in relation to FIG. 3.

The sealing member 260 is configured to seal the connection between the optical connector assembly 251 and the system console 123 when the guide coupling housing 250 is inserted and selectively retained within the console connection aperture 148. With such design, the sealing member 260, which can be provided in the form of a face gasket in one non-exclusive embodiment, can help to limit the amount of dust and other particulates that may otherwise be introduced into the guide coupling housing 250 and/or the guide coupler 252. In some embodiments, the sealing member 260 can be formed from a resilient material that can effectively provide a sealed connection between the guide coupling housing 250 and the console connection aperture 148. Alternatively, the sealing member 260 can be formed from another suitable material.

The contaminant inhibitor 262 is configured to limit the amount of dust, fluids and/or other particulates (also sometimes individually or collectively referred to herein as "contaminates") that may act as an impediment or otherwise contaminate the guide face of each of the one or more energy guides 122A. More particularly, as shown, the contaminant inhibitor 262 can be configured to be positioned about a portion of the guide coupling housing 250 within which the ferrules 366, and thus the guide proximal end 122P of each of the energy guides 122A, are retained. The contaminant inhibitor 262 can have any suitable design which is configured to inhibit the introduction of dust and other particulates into the guide coupling housing 250 while still permitting energy from the energy source 124 to be coupled into the guide proximal end 122P of each of the one or more energy guides 122A.

In certain embodiments, the contaminant inhibitor 262 can be disposable such that when the contaminate inhibitor 262 gets sufficiently contaminated with contaminates, the contaminant inhibitor 262 can be simply thrown away. In other embodiments, the contaminant inhibitor 262 can be reusable, such that it can be selectively removed from the guide coupling housing 250 and cleaned, and then again selectively coupled to the guide coupling housing 250 for additional use.

The locking mechanism 264 is configured to selectively lock the optical connector assembly 251 in position when it is coupled into the console connection aperture 148. More specifically, during use of the catheter system 100, as the optical connector assembly 251 is inserted into the console connection aperture 148 of the system console 123, the optical sensors 167 register it and initiate the actuator 169 that mechanically draws the optical connector assembly 251 into place and locks it in position. The locking mechanism 264 provides an effective means to thus lock the optical connector assembly 251 in such position where the optical connector assembly 251 has been inserted into the console connection aperture 148 so that it can be selectively retained therein.

Figure 3:
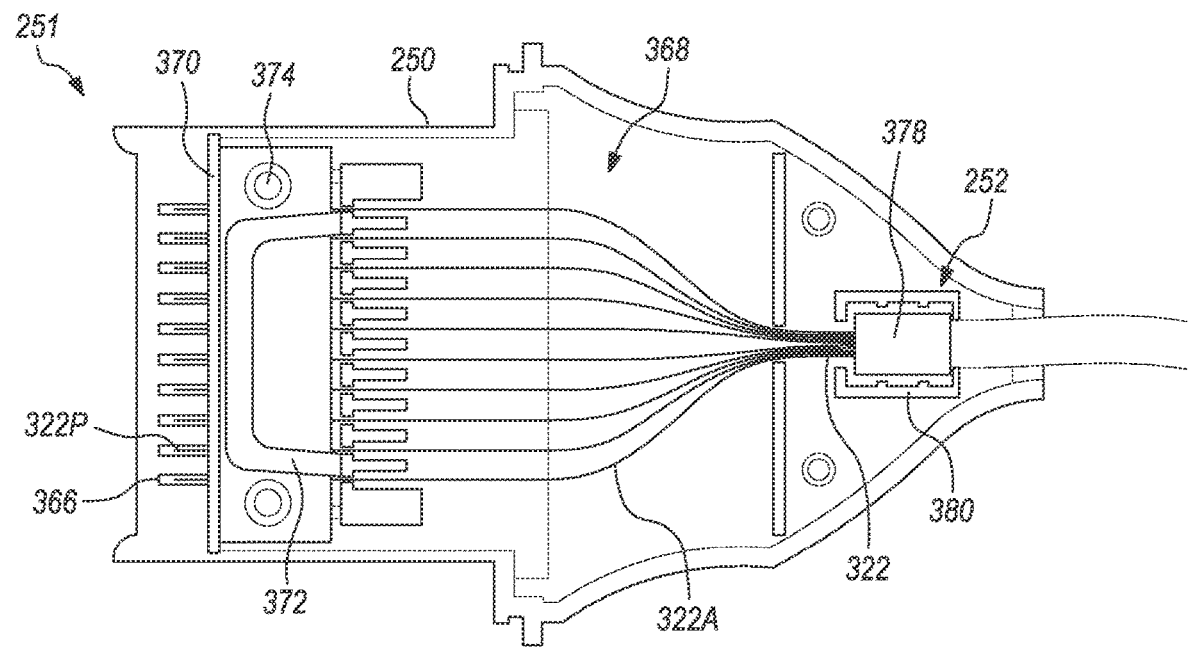
FIG. 3 is a simplified top view illustration of a portion of the optical connector assembly illustrated in FIG. 2.

FIG. 3 is a simplified top view illustration of a portion of the optical connector assembly 251 (illustrated in FIG. 2). More specifically, FIG. 3 illustrates various internal components and features that can be included in various embodiments of the optical connector assembly 251. As shown in FIG. 3, in various embodiments, the optical connector assembly 251 can internally include within the guide coupling housing 250 one or more of a plurality of ferrules 366, a ferrule housing 370, a portion of the one or more energy guides 322A, a resilient plate 372, at least one position compensator 374 (such as a silicone gasket in one non-exclusive embodiment), and at least a portion of the guide bundler 252. It is appreciated that only one of the housing members 250A, 250B of the guide coupling housing 250 is visible in FIG. 3 so that the other noted components can be clearly seen positioned within the housing cavity 368 that is defined within the guide coupling housing 250.

As utilized herein, a "ferrule" is a component in fiber optics used for protecting and aligning a stripped end of the energy guide 322A (or optical fiber). During use, the energy guide 322A is inserted into the thin structure of the ferrule 366 and can be provided with an adhesive (not shown) to prevent contamination as well as to give it long-term mechanical strength. The ferrules 366 can be formed from any suitable materials for purposes of providing the desired contamination protection for the stripped guide proximal end 322P of the energy guides 322A as well as the enhanced, long-term mechanical strength.

The optical connector assembly 251 can include any suitable number of ferrules 366 within the housing cavity 368 as defined by the guide coupling housing 250, depending on the number of energy guides 322A that are to be optically connected to the energy source 124 (illustrated in FIG. 1). For example, in one non-exclusive embodiment, as shown in FIG. 3, the optical connector assembly 251 can include ten ferrules 366 that are each configured to retain and protect a portion, such as the guide proximal end 322P, of one of the one or more energy guides 322A. Alternatively, the optical connector assembly 251 can include greater than ten or less than ten ferrules 366.

The ferrule housing 370 is configured to provide a housing for the ferrules 366 so that the ferrules 366 can be moved and positioned collectively relative to the energy from the energy source 124, with the ferrules 366 maintained spaced apart a desired distance from one another, and so that the guide proximal end 322P of each of the energy guides 322A can be properly aligned to accurately receive energy from the energy source 124. At the side of the guide coupling housing 250 that faces the console connection aperture 148 (illustrated in FIG. 1) of the system console 123 (illustrated in FIG. 1), i.e. the left side in FIG. 3, faces of the ferrules 366 are exposed. In certain embodiments, the ferrules 366 are allowed to float significantly in the ferrule housing 370 to allow for the ferrules 366, and thus the guide proximal end 322P of the energy guides 322A, to more accurately line up with the console connection aperture 148 of the system console 123.

Figure 4:
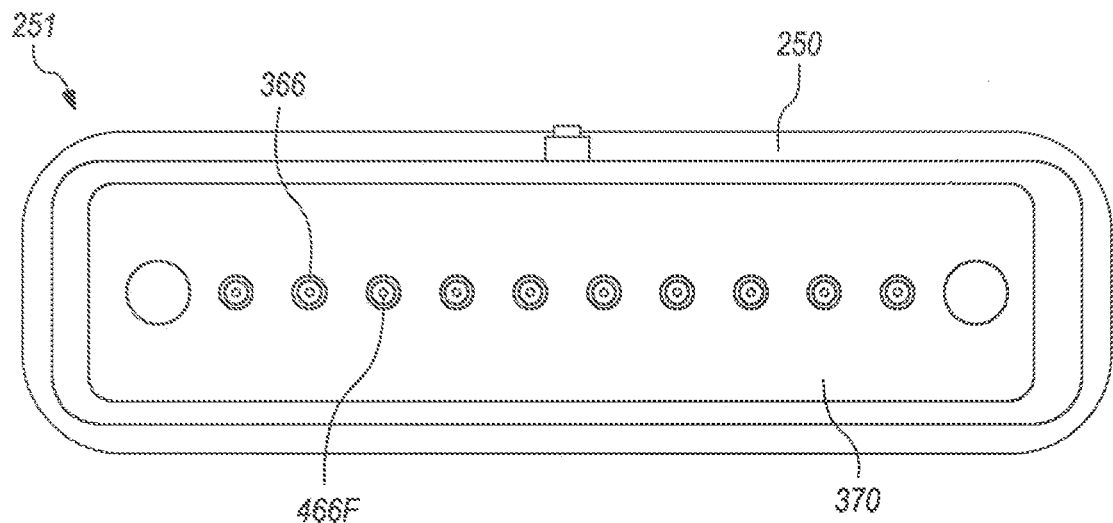
FIG. 4 is a simplified end view illustration of the optical connector assembly illustrated in FIG. 2.

FIG. 4 is a simplified end view illustration of the optical connector assembly 251 illustrated in FIG. 2. More particularly, FIG. 4 illustrates a face 466F of each of the ferrules 366 as the ferrules 366 are retained in generally spaced apart desired positions within the ferrule housing 370. In some embodiments, as illustrated, the ferrules 366 are positioned within positioning apertures 476 that are formed into the ferrule housing 370. As shown, the positioning apertures 476 can be sized to have tolerances that enable a loose fit of the ferrules 366 within the positioning apertures 476. Stated in another manner, in certain embodiments, the positioning apertures 476 are slightly larger than a diameter of the ferrules 366 to allow the ferrule 366 to move relative to the ferrule housing 370. With such design, as noted, the ferrules 366 are allowed to float significantly in the ferrule housing 370 to allow for the ferrules 366, and thus the guide proximal end 322P (illustrated in FIG. 3) of the energy guides 322A (illustrated in FIG. 3), to more accurately line up with the console connection aperture 148 (illustrated in FIG. 1) of the system console 123 (illustrated in FIG. 1).

As the optical connector assembly 251 is advanced into the console connection aperture 148, the ferrules 366 find their place in the console connection aperture 148 due to a chamfer lead-in on the console connection aperture 148. This allows for a tight tolerance on the console connection aperture 148 and the tight tolerances of the ferrules' outer diameter to drive the fit.

In various embodiments, the ferrule housing 370 can also be selectively adjustable in position within the guide coupling housing 250 to better enable the desired alignment between the energy guides 322A and the energy from the energy source 124 (illustrated in FIG. 1). Stated in another manner, in addition to the loose fit between the ferrules 366 and the positioning apertures 476 in the ferrule housing 370, the ferrule housing 370 is also allowed to float (up-and-down and/or side-to-side) inside the assembled guide coupling housing 250. With such design, enabling of the accurate and precise positioning of the guide proximal end 322P of each of the energy guides 322A relative to the energy from the energy source 124 is further enhanced.

Returning again to FIG. 3, the resilient plate 372, such as a spring plate in certain embodiments, is configured to control the floating of the ferrule housing 370 within the guide coupling housing 250. More particularly, as the ferrule housing 370 is allowed to float within the guide coupling housing 250, it is desired that the ferrule housing 370 does not just float loosely without control within the guide coupling housing 250. The resilient plate 372 provides a biasing force that allows the ferrule housing 370 to float within the guide coupling housing 250 while enabling the ferrule housing 370 to be resiliently maintained in position within the guide coupling housing 250 once a desired positioning is accurately determined.

The at least one position compensator 374, such as silicone gaskets in certain non-exclusive embodiments, is configured to provide a spring force to keep the ferrules 366 in an aligned position, while still allowing play within the ferrule housing 370. However, if the ferrule housing 370 needs to adjust to accommodate fit with the ferrules 366 relative to the console connection aperture 148 and/or the energy from the energy source 124, then the ferrule housing 370 can be moved to accommodate such adjusted position. Without the at least one position compensator 374, the ferrules 366 could seize with the console connection aperture 148, due to fit interference.

The optical connector assembly 251 can include any suitable number of position compensators 374. For example, in one non-exclusive embodiment, the optical connector assembly 251 can include four position compensators 374. Alternatively, in other embodiments, the optical connector assembly 251 can include greater than four or less than four position compensators 374.

As noted above, the guide bundler 252 is configured to provide strain relief as it brings each of the individual energy guides 322A closer together so that the energy guides 322A and/or the energy guide bundle 322 can be in a more compact form as it extends with the catheter 102 (illustrated in FIG. 1) into the blood vessel 108 (illustrated in FIG. 1) during use of the catheter system 100 (illustrated in FIG. 1). The design of the guide bundler 252 can be varied. For example, as shown in FIG. 3, in certain embodiments, the guide bundler 252 can include a shaft jacket 378 within which all of the energy guides 322A are maintained as the energy guide bundle 322 extends with the catheter 102 toward the balloon 104 (illustrated in FIG. 1). The guide bundler 252 can also include a locking crimp 380 that is configured to tightly bunch the energy guides together in a controlled manner to form the energy guide bundle 322.

As shown, FIG. 3 also illustrates the routing of the energy guides 322A as they extend through the guide coupling housing 250 of the optical connector assembly 251. More specifically, the guide proximal end 322P of each of the energy guides 322A is positioned within one of the ferrules 366 near the side of the guide coupling housing 250 that faces the console connection aperture 148 (illustrated in FIG. 1) of the system console 123, with the energy guides 322A being positioned at a desired spacing relative to one another. The energy guides 322A then extend through the guide coupling housing 250 to where they are brought closer together, or bundled together, at the guide bundler 252. The energy guide bundle 322, with the energy guides 322A positioned within the shaft jacket 378, then extends with the catheter 102 toward the balloon 104.

Figure 5:
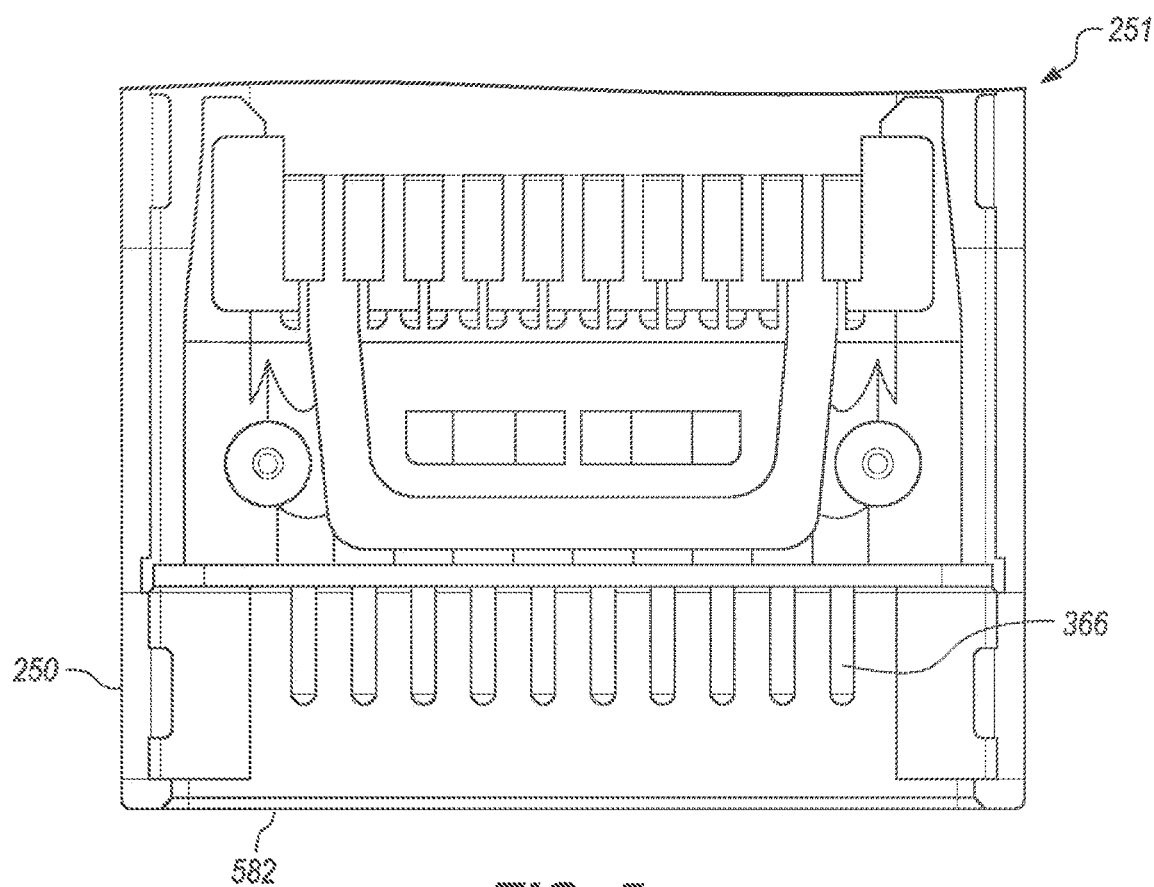
FIG. 5 is a simplified top view illustration of another portion of the optical connector assembly illustrated in FIG. 2.

FIG. 5 is a simplified top view illustration of another portion of the optical connector assembly 251 illustrated in FIG. 2. As shown in FIG. 5, in some embodiments, the ferrules 366 are positioned in a manner within the guide coupling housing 250 such that the ferrules 366 are recessed relative to a console facing side 582 of the guide coupling housing 250. With the ferrules 366 being recessed from the console facing side 582 of the guide coupling housing 250, the optical connector assembly 251 is configured to help ensure that fingers or other objects do not come into contact with faces of the energy guides 322A (illustrated in FIG. 3), at the guide proximal end 322P (illustrated in FIG. 3) of the energy guides 322A, which could otherwise lead to undesired contamination.

The ferrules 366 can be recessed any desired distance from the console facing side 582 of the guide coupling housing 250 depending of the specific design requirements of the optical connector assembly 251 and/or the catheter system 100 (illustrated in FIG. 1).

The present technology is also directed toward methods for treating a treatment site within or adjacent to a vessel wall, with such methods utilizing the devices disclosed herein. In various embodiments, the catheter systems and related methods disclosed herein can include a catheter configured to advance to a vascular lesion, such as a calcified vascular lesion or a fibrous vascular lesion, at a treatment site located within or adjacent a blood vessel within a body of a patient. The catheter includes a catheter shaft, and an inflatable balloon that is coupled and/or secured to the catheter shaft. The balloon can include a balloon wall that defines a balloon interior. The balloon can be configured to receive a catheter fluid within the balloon interior to expand from a deflated state suitable for advancing the catheter through a patient's vasculature, to an inflated state suitable for anchoring the catheter in position relative to the treatment site.

It should be noted that, as used in this specification and the appended claims, the singular forms "a," "an," and "the" include plural referents unless the content and/or context clearly dictates otherwise. It should also be noted that the term "or" is generally employed in its sense including "and/or" unless the content or context clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

It is recognized that the figures shown and described are not necessarily drawn to scale, and that they are provided for ease of reference and understanding, and for relative positioning of the structures.

The headings used herein are provided for consistency with suggestions under 37 CFR 1.77 or otherwise to provide organizational cues. These headings shall not be viewed to limit or characterize the invention(s) set out in any claims that may issue from this disclosure. As an example, a description of a technology in the "Background" is not an admission that technology is prior art to any invention(s) in this disclosure. Neither is the "Summary" or "Abstract" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the catheter systems have been illustrated and described herein, one or more features of any one embodiment can be combined with one or more features of one or more of the other embodiments, provided that such combination satisfies the intent of the present invention.

While a number of exemplary aspects and embodiments of the catheter systems have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope, and no limitations are intended to the details of construction or design herein shown.

What is claimed is:

1. A catheter system for use by a user in treating a treatment site within or adjacent to a blood vessel in a patient, the catheter system comprising:
    a system console including an energy source, an optical sensor, an actuator, and a console connection aperture, the energy source generating energy;
    one or more energy guides that are configured to receive energy from the energy source; and
    an optical connector assembly including a guide coupling housing that retains at least a portion of each of the one or more energy guides, the guide coupling housing being configured to be mechanically connected to the system console, at least a portion of the guide coupling housing being configured to fit and be selectively retained within the console connection aperture so that the one or more energy guides are adjustably aligned within the guide coupling housing to better receive the energy from the energy source, the optical connector assembly including a plurality of ferrules, each ferrule being configured to retain a portion of one of the one or more energy guides, the optical connector assembly including a ferrule housing, the ferrule housing having a plurality of positioning apertures, each positioning aperture being configured to retain at least a portion of one of the plurality of ferrules, each of the plurality of positioning apertures having a diameter that is larger than a diameter of the ferrule that is retained therein so that the ferrule is movable within the positioning aperture,
    wherein the optical sensor is configured to (i) sense a position of the guide coupling housing relative to the console connection aperture, and (ii) initiate the actuator that mechanically draws the guide coupling housing into place within the console connection aperture.

2. The catheter system of claim 1 wherein the optical connector assembly further includes a position compensator that is configured to provide a spring force to maintain the ferrules in an aligned position relative to the console connection aperture while allowing the ferrules to move relative to the ferrule housing.

3. The catheter system of claim 1 wherein the ferrule housing is adjustably positioned within the guide coupling housing so that the ferrule housing is movable within the guide coupling housing.

4. The catheter system of claim 1 wherein the optical connector assembly further includes a resilient plate that is configured to control movement of the ferrule housing within the guide coupling housing.

5. The catheter system of claim 4 wherein the resilient plate includes a spring plate.

6. The catheter system of claim 1 wherein the guide coupling housing includes a console facing side, the plurality of ferrules being recessed from the console facing side of the guide coupling housing.

7. The catheter system of claim 1 wherein the guide coupling housing defines a housing cavity, each of the plurality of ferrules, the ferrule housing, the position compensator, and the resilient plate being retained within the housing cavity.

8. The catheter system of claim 7 wherein the guide coupling housing is formed from a first housing member and a second housing member that are selectively connected together to define the housing cavity therein.

9. The catheter system of claim 1 wherein the optical connector assembly further includes a sealing member that seals the connection between the guide coupling housing and the console connection aperture.

10. The catheter system of claim 1 wherein the optical connector assembly further includes a contaminant inhibitor that is positionable about at least a portion of the guide coupling housing, the contaminant inhibitor being configured to inhibit contaminates from contaminating a face of at least one of the energy guides.

11. The catheter system of claim 1 wherein the optical connector assembly further includes a locking mechanism that is configured to lock the guide coupling housing into position when the guide coupling housing is being retained within the console connection aperture.

12. The catheter system of claim 1 wherein the optical connector assembly further includes a guide bundler that is configured to provide strain relief while bringing the one or more energy guides together to form an energy guide bundle.

13. The catheter system of claim 12 wherein the guide bundler includes a shaft jacket within which all of the one or more energy guides are retained as the energy guide bundle.

14. The catheter system of claim 13 wherein the guide bundler further includes a locking crimp that is configured to tightly bunch the one or more energy guides together to form the energy guide bundle.

15. The catheter system of claim 1 further comprising a balloon that is configured to be positioned substantially adjacent to the treatment site, the balloon including a balloon wall that defines a balloon interior, each of the one or more energy guides including a guide distal end that is positionable within the balloon interior, each of the one or more energy guides being configured to guide energy from the energy source through the energy guide and into the balloon interior to generate a plasma bubble within the balloon interior so that a pressure wave is generated that imparts a force upon the treatment site.

16. The catheter system of claim 1 wherein at least one of the one or more energy guides includes an optical fiber, and the energy source includes a laser.

17. The catheter system of claim 1 wherein the energy source is a high voltage energy source that provides pulses of high voltage.

18. The catheter system of claim 17 wherein at least one of the one or more energy guides includes an electrode pair including spaced apart electrodes that extend into the balloon interior, and pulses of high voltage from the energy source are applied to the electrodes and form an electrical arc across the electrodes.

19. A catheter system for use by a user in treating a treatment site within or adjacent to a blood vessel in a patient, the catheter system comprising:
- a system console including an energy source and a console connection aperture, the energy source generating energy;
- one or more energy guides that are configured to receive energy from the energy source; and
- an optical connector assembly including a guide coupling housing that retains at least a portion of each of the one or more energy guides, the guide coupling housing being configured to be mechanically connected to the system console, at least a portion of the guide coupling housing being configured to fit and be selectively retained within the console connection aperture so that the one or more energy guides are adjustably aligned within the guide coupling housing to better receive the energy from the energy source, the optical connector assembly including a plurality of ferrules, each ferrule being configured to retain a portion of one of the one or more energy guides, the optical connector assembly including a ferrule housing, the ferrule housing having a plurality of positioning apertures, each positioning aperture being configured to retain at least a portion of one of the plurality of ferrules, each of the plurality of positioning apertures having a diameter that is larger than a diameter of the ferrule that is retained therein so that the ferrule is movable within the positioning aperture, the optical connector assembly including a sealing member that seals the connection between the guide coupling housing and the console connection aperture, the optical connector assembly including a contaminant inhibitor that is positionable about at least a portion of the guide coupling housing, the contaminant inhibitor being configured to inhibit contaminates from contaminating a face of at least one of the energy guides, the system console including an optical sensor and an actuator, the optical sensor being configured to (i) sense a position of the guide coupling housing relative to the console connection aperture, and (ii) initiate the actuator that mechanically draws the guide coupling housing into place within the console connection aperture.

20. The catheter system of claim 19, wherein the optical connector assembly further includes a position compensator that is configured to provide a spring force to maintain the plurality of ferrules in an aligned position relative to the console connection aperture while allowing the ferrules to move relative to the ferrule housing.

\* \* \* \* \*